US010555086B2

(12) United States Patent
Merewether et al.

(10) Patent No.: US 10,555,086 B2
(45) Date of Patent: Feb. 4, 2020

(54) MAGNETIC FIELD CANCELING AUDIO SPEAKERS FOR USE WITH BURIED UTILITY LOCATORS OR OTHER DEVICES

(71) Applicant: SeeScan Inc., San Diego, CA (US)

(72) Inventors: Ray Merewether, La Jolla, CA (US); Mark S Olsson, La Jolla, CA (US)

(73) Assignee: SEESCAN, INC., San Diego, CA (US)

(*) Notice: Subject to any disclaimer, the term of this patent is extended or adjusted under 35 U.S.C. 154(b) by 0 days.

(21) Appl. No.: 15/870,787

(22) Filed: Jan. 12, 2018

(65) Prior Publication Data
US 2019/0028812 A1 Jan. 24, 2019

Related U.S. Application Data

(60) Provisional application No. 62/445,711, filed on Jan. 12, 2017.

(51) Int. Cl.
H04R 9/00 (2006.01)
H04R 9/06 (2006.01)
H04R 1/28 (2006.01)
H04R 9/02 (2006.01)
H04R 19/01 (2006.01)

(52) U.S. Cl.
CPC .......... *H04R 9/063* (2013.01); *H04R 1/2811* (2013.01); *H04R 9/025* (2013.01); *H04R 19/013* (2013.01)

(58) Field of Classification Search
CPC .......................... H04R 2209/022; H04R 1/24
See application file for complete search history.

(56) References Cited

U.S. PATENT DOCUMENTS

| 1,808,149 | A | * | 6/1931 | Smith | H04R 1/24 381/401 |
| 2,926,221 | A | * | 2/1960 | Kagdis | H04R 9/02 381/401 |
| 4,016,953 | A | * | 4/1977 | Butler | H04R 1/227 381/89 |
| 2005/0163338 | A1 | * | 7/2005 | Ohashi | H04R 9/025 381/421 |
| 2007/0092093 | A1 | * | 4/2007 | Shim | H04R 9/02 381/189 |
| 2014/0056466 | A1 | * | 2/2014 | Jenq | H04R 1/403 381/401 |
| 2015/0110329 | A1 | * | 4/2015 | Tanaka | H04R 1/1016 381/380 |
| 2015/0139479 | A1 | * | 5/2015 | Lai | H04R 9/025 381/412 |

FOREIGN PATENT DOCUMENTS

EP   0390123 A2   10/1990

OTHER PUBLICATIONS

International Searching Authority, "Written Opinion of the International Searching Authority" for PCT Patent Application No. PCT/US18/13669, dated Jul. 19, 2018, European Patent Office, Munich.

* cited by examiner

Primary Examiner — Matthew A Eason
(74) Attorney, Agent, or Firm — Steven C. Tietsworth, Esq.

(57) ABSTRACT

Magnetic field cancelling audio speakers and associated devices are disclosed. In one embodiment, a utility locator includes an audio speaker device with two loudspeaker drivers positioned and electrically connected to reduce emitted magnetic fields over a range of frequencies corresponding with locator sensing frequencies.

26 Claims, 21 Drawing Sheets

MAGNETIC FIELD CANCELING AUDIO SPEAKERS FOR USE WITH BURIED UTILITY LOCATORS OR OTHER DEVICES

FIELD

This disclosure relates generally to audio speakers for converting electrical signals into sound with reduced magnetic field emissions. More specifically, but not exclusively, the disclosure relates to magnetic field canceling audio speakers for producing sound across a range of frequencies suitable for use in utility locators or other devices that are sensitive to magnetic fields produced from speaker driver components.

BACKGROUND

Loudspeakers (also denoted as "Audio Speakers" or simply "Speakers" for brevity) for converting electrical signals into sound are very well known in the art. Speakers may generate an electromagnetic signature that, in some applications, interferes with the intended function of various devices and sensors that sense electromagnetic fields. For example, in devices for detecting and measuring magnetic field signals (e.g., utility locator devices, electromagnetic frequency meters, devices with magnetometers or other magnetic sensors, and the like) the frequency range of the electromagnetic signature emitted by audio speakers may coincide or overlap with the frequency range of electromagnetic energy being detected and measured by such devices. Consequently, the electromagnetic signature of the speakers may interfere with measurements made by these devices, resulting in distorted or otherwise inaccurate measurements.

Speakers with magnetic field cancellation have been known in the art. For example, in many audio speakers, the magnetic field emitted by permanent magnets in the speaker driver (e.g., in a speaker with a convention magnet and coil construction) is canceled by shielding. However, existing speakers typically do nothing to cancel magnetic fields from the driver's voice coil caused by current flows therein. As a result, conventional speakers, even with shielding, can generate electromagnetic signatures that interfere with sensitive magnetic field detection devices such as utility locators.

Piezoelectric speakers can produce smaller electromagnetic signatures at the driver, but are typically driven at voltages that cause an interfering electromagnetic signature at the power supply. Further, many piezoelectric speakers fail to produce the quality of dynamic sound across the full range of frequencies heard by humans.

As such, magnetically canceling audio speakers known in the art fail in magnetic field sensing applications by generating an interfering electromagnetic signature, failing to provide quality dynamic sound, or both. Accordingly, there is a need in the art to address the above-described as well as other problems related to producing quality dynamic sound while having a small electromagnetic signature.

SUMMARY

This disclosure relates generally to audio speaker devices for converting electrical signals into sound. More specifically, but not exclusively, the disclosure relates to magnetic canceling audio speaker devices for producing quality dynamic sound across a range of frequencies while eliminating or reducing magnetic field emissions from voice coils or other wires in a magnetic sensing utility locator.

In one aspect, the disclosure relates to a utility locator system. The system may include a buried utility locator. The locator may include a housing, a magnetic field antenna array disposed on or in the housing for receiving magnetic field signals emitted from a hidden or buried conductor based on current flow therein and providing corresponding electrical output signals, and utility locator electronics circuit disposed on or in the housing and operatively coupled to the magnetic field antenna array output to receive the electrical output signals and generate information about the hidden or buried conductor. The locator system may further include an audio signal generator and audio amplifier operatively coupled to the utility locator electronics circuit to generate and provide an audio output signal associated with operation of the utility locator. The audio signal generator and/or amplifier may be disposed on or within the locator housing or may be separate from the locator. The system may further include an audio speaker device. The audio speaker device may include, for example, a speaker enclosure, input wiring, such as twisted pairs or other wiring operatively coupled to the audio output signal, a first loudspeaker driver having terminals operatively coupled to the input wiring to receive the audio output signal with a first polarity, and a second loudspeaker driver having terminals operatively coupled to the input wiring to receive the audio output signal with a second polarity. The first and second loudspeaker drivers may be of the same type and may have the same components. The first and second loudspeaker drivers may be electrostatic drivers. The first loudspeaker driver and the second loudspeaker driver may be positioned within the speaker enclosure so as to at least partially cancel alternating current (AC) magnetic field signals emitted therefrom over a predefined frequency or range of frequencies overlapping the frequency or range of frequencies emitted from the hidden or buried conductor and sensed by the buried utility locator.

Various additional aspects, features, and functionality are further described below in conjunction with the appended Drawings.

BRIEF DESCRIPTION OF THE DRAWINGS

The present disclosure may be more fully appreciated in connection with the following detailed description taken in conjunction with the accompanying drawings, wherein.

DETAILED DESCRIPTION OF EMBODIMENTS

Overview

Figure 1:
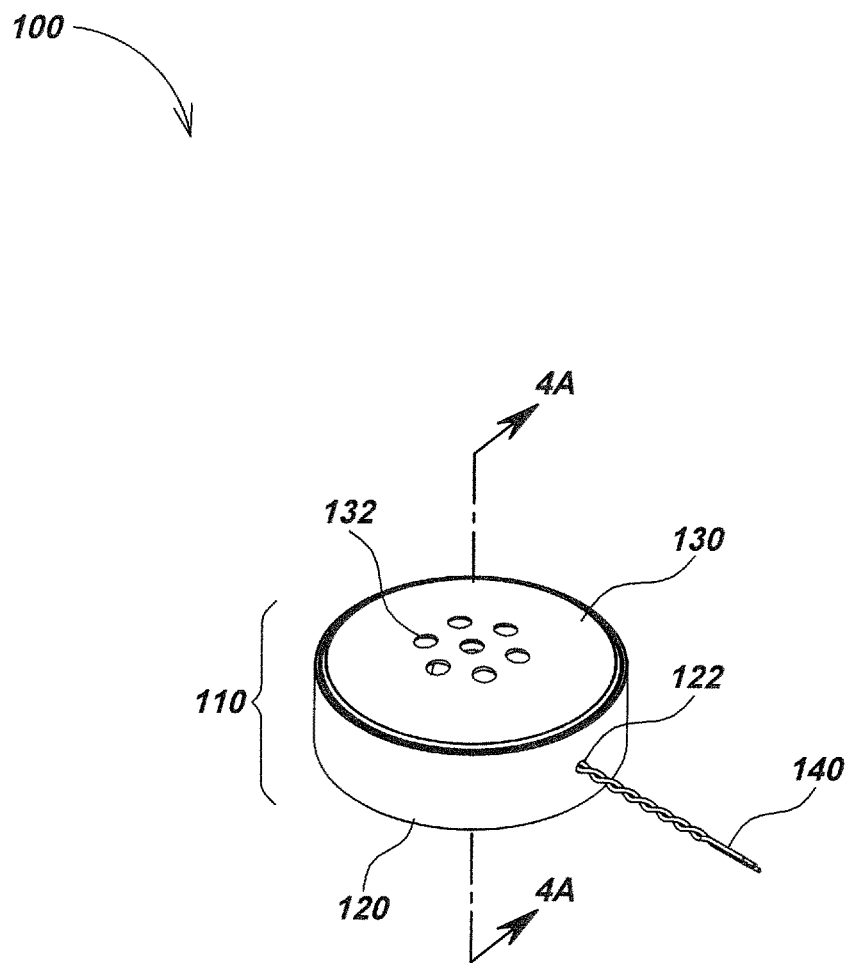
FIG. 1 illustrates an audio speaker device embodiment in isometric view.

This disclosure relates generally to audio speaker devices for converting electrical signals into sound. More specifically, but not exclusively, the disclosure relates to magnetic canceling audio speaker devices for producing quality dynamic sound across a range of frequencies, the speakers usable in utility locators or other devices sensitive to the magnetic signature produced from loudspeakers.

The audio speaker devices described herein may have pairs of loudspeaker drivers arranged so that emitted magnetic fields are attenuated over a desired frequency or range of frequencies without impairing their output sound. For example, the polarity of one driver may be oriented in opposition to the polarity of a paired driver to reduce the net magnetic fields. In some embodiments, drivers may be oriented such that only electromagnetic fields emitted from opposing loudspeakers cancel. Embodiments of audio speaker devices herein may provide high quality dynamic sound across a predefined range of frequencies while reducing magnetic field interference with associated devices or system. For example, each loudspeaker may generate sound over a range for providing high quality human speech while reducing magnetic field interference with a utility locator or other magnetic sensing device.

Loudspeaker elements within pairs of drivers having magnetic fields with opposing magnetic polarities (e.g., north facing north or south facing south pole orientations) may be of the same or largely the same type/construction, and may be positioned back to back closely together about a shared axis. Aligning of emitted magnetic fields in polar opposition may allow for the magnetic fields from each loudspeaker to cancel and thus have an overall lower magnetic signature so as to reduce distortion to an associated magnetic sensing device such as a utility locator. The polar opposition orientations of magnetic elements within the loudspeakers may create a magnetic quadrupole which advantageously falls off more rapidly with distance than does a magnetic dipole field as is normal in loudspeakers.

Another aspect relates to an optional magnetic shielding enclosure for containing pairs of drivers of audio speaker devices. For example, the magnetically shielding enclosure may comprise tin plated mild steel or other highly magnetically permeable materials or other magnetic shielding materials or apparatus. Sound holes may be formed through the enclosure allowing sound to be emitted from loudspeakers contained within.

Audio speaker device embodiments as described herein may be advantageously used in a utility locator other devices sensitive to the magnetic signature emitted by speakers.

In another aspect, audio speaker device embodiments may include an annular PCB having a central opening dimensioned to allow the rear portion of each speaker driver to seat therein. The PCB may contain spring contacts on both faces that align with contacts on each loudspeaker. In assembly, spring contacts on the PCB may press into contacts on each loudspeaker establishing electrical pathways between each loudspeaker and the PCB.

In another aspect, the current invention may include a sound directing enclosure to direct sound out in a single direction while benefiting from the magnetic canceling of an audio speaker device embodiment therein.

In another aspect, audio speaker device embodiments such as speaker device embodiment 100 as shown in FIG. 1 or other speaker device embodiments and associated components as shown elsewhere in this disclosure may be used with a buried utility locator or other magnetic field sensing device. A buried utility locator as described herein uses magnetic field antennas or antenna arrays to receive magnetic field signals resulting from AC current flow in a conductor (typically a hidden or buried conductor) and processes the received magnetic field signals to determine information about the buried utility, such as its position and/or depth relative to the locator, as well as other parameters such as current flow in the conductor, mapping of the positions of one or more conductors, detecting and processing magnetic field dipole sonde signals, energizing, detecting, and processing RFID signals, and the like. Audio speaker devices as disclosed herein may be incorporated or be operatively coupled to a utility locator system, locator antenna array, or may be used on or within other magnetically sensitive devices or systems.

For example, a utility locator system may include a buried utility locator. The locator may include a housing, a magnetic field antenna array disposed on or in the housing for receiving magnetic field signals emitted from a hidden or buried conductor based on current flow therein and providing corresponding electrical output signals, and utility locator electronics circuit disposed on or in the housing and operatively coupled to the magnetic field antenna array output to receive the electrical output signals and generate information about the hidden or buried conductor. The locator system may further include an audio signal generator and audio amplifier operatively coupled to the utility locator electronics circuit to generate and provide an audio output signal associated with operation of the utility locator. The audio signal generator and/or amplifier may be disposed on or within the locator housing or may be separate from the locator. The system may further include an audio speaker device. The audio speaker device may include, for example, a speaker enclosure, input wiring, such as twisted pairs or other wiring operatively coupled to the audio output signal, a first loudspeaker driver having terminals operatively coupled to the input wiring to receive the audio output signal with a first polarity, and a second loudspeaker driver having terminals operatively coupled to the input wiring to receive the audio output signal with a second polarity. The first and second loudspeaker drivers may be of the same type and may have the same components. The first and second loudspeaker drivers may be electrostatic drivers. The first loudspeaker driver and the second loudspeaker driver may be positioned within the speaker enclosure so as to at least partially cancel alternating current (AC) magnetic field signals emitted therefrom over a predefined frequency or range of frequencies overlapping the frequency or range of frequencies emitted from the hidden or buried conductor and sensed by the buried utility locator.

The audio speaker device, audio signal generator, and/or audio amplifier may be disposed on or within the buried utility locator housing. One or more of the audio speaker device, the audio signal generator, and the audio amplifier may be separate from the buried utility locator housing. The first polarity and the second polarity may be the same polarity. The first polarity and the second polarity may be opposite polarities. The first loudspeaker driver may have a first magnet and the second loudspeaker driver may have a second magnet that may correspond with the first magnet. The first loudspeaker driver may be positioned in close proximity to the second loudspeaker driver so that the polarities of the first magnet and second magnet are the same or alternately may be opposite. The first loudspeaker driver may have a first voice coil and the second loudspeaker driver may have second voice coil, that may be a corresponding voice coil The first loudspeaker voice coil and the second loudspeaker voice coil may be positioned so that the first loudspeaker voice coil and the second loudspeaker voice coil are in polar opposition, or alternately so that the coils have the same polarity. The speaker enclosure may be magnetically shielded with a magnetically permeable material. The magnetically permeable material may be tin plated mild steel or another magnetically permeable material. The speaker enclosure may be cylindrical in shape and may include a passage with a twisted pair electrical signal wire passed therethrough. The locator may include a pair of caps having sound hole features, with the caps positioned in the housing. The housing may include a toroidal groove feature, the caps include a lip feature, and the lips may be positioned in close contact with the toroidal groove. The loudspeaker drivers may be positioned about a shared longitudinal axis. The locator may include a locator handle. The audio speaker device may be disposed in, on, or within the handle, or in, on, or within the locator housing. The audio speaker device may include a PCB having spring contacts. The spring contacts may press into corresponding contacts on the loudspeaker drivers to establish electrical pathways to communicate electrical sound signals thereto. The locator device may include a PCB. The PCB may be a junction point for coupling signal wires within and exterior to the housing. The PCB may be annular shaped and may be dimensioned to accommodate the rear portion of each loudspeaker driver therein. The audio speaker device may include an enclosure to direct sound from both loudspeaker drivers in a common direction. The common direction may be a front or forward direction oriented to direct sound away from the locator. The loudspeaker drivers may include pole components having holes therein to shape a magnetic field. Magnets of each of the loudspeaker drivers may be positioned at least partially within the holes to shape their magnetic field so as to reduce interference with the locator antennas. The locator may include a front enclosure facing. The facing may be positioned in close proximity to a first of the loudspeaker drivers. The facing may have one or more sound holes. A sound redirecting portion may redirect incident sound waves from the other of the loudspeaker drivers towards the front facing and sound holes.

Various additional aspects, features, and functionality are further described below in conjunction with the appended Drawings.

Example Embodiments

Turning to FIG. 1, an audio speaker device embodiment 100 in accordance with aspects of the present disclosure is illustrated. Speaker 100 may include a speaker enclosure 110 having a pair of loudspeaker drivers within (e.g., drivers 210a and 210b illustrated in FIG. 2). The enclosure 110 may optionally be magnetically shielded with a magnetic shielding material such as tin plated mild steel or other magnetically permeable materials or shielding materials or assemblies. In other embodiments, the enclosure may be made of other materials, or the audio speaker device may have no enclosure. Audio speaker devices may cancel magnetic fields using opposing polarities in loudspeaker drivers (e.g., north facing north or south facing south pole orientations) to prevent or reduce generation of external electromagnetic fields, and correspondingly reduce or eliminate interfering magnetic signatures. Cancelling of dipole fields may result in a quadrupole field, which advantageously falls off more rapidly with distance than the dipole field generated by typical loudspeakers.

The enclosure 110 may include a housing 120 of a metallic, plastic, or other material that may be cylindrical in shape and that may seat a cap 130 comprising a metallic, plastic, or other material (one of two caps in the illustrated embodiment is obscured for view within FIG. 1) onto each end of the housing 120 in assembly. The housing 120 may be cylindrical in shape add may be formed or cut with a passage 122 allowing a twisted pair of electrical signal wires 140 to pass through. The wires 140 may be used to provide sound signals to drive the drivers 210a and 210b (as show in FIG. 2) within enclosure 110 from an external source (e.g. a utility locator 700 of FIG. 7A including an audio signal generator and amplifier to provide the electrical signal or from another audio generating device or system). Each cap 130 may be formed or cut with a series of sound hole features 132. The sound hole features 132 are cuts or opening to allow sound generated within enclosure 110 to propagate to the exterior (to be heard by a locator or other device user/operator), while also providing optional magnetic shielding of the enclosure 110, for example by providing a path for the magnetic fields emitted from drivers 210a and 210b and aiding in containing/attenuating magnetic fields.

Figure 2A:
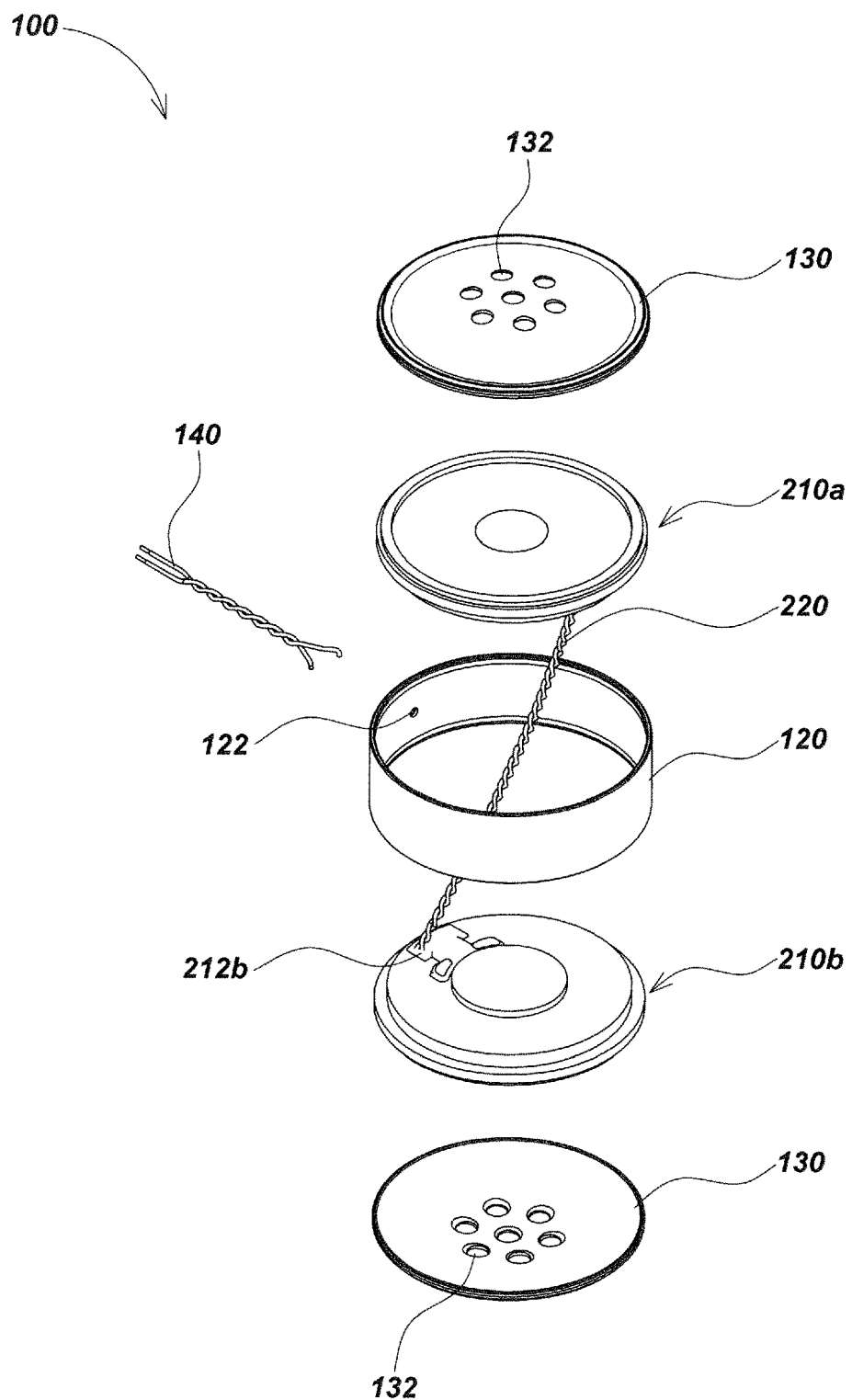
FIG. 2A illustrates the audio speaker embodiment of FIG. 1 in a top-down isometric exploded view.
Figure 2B:
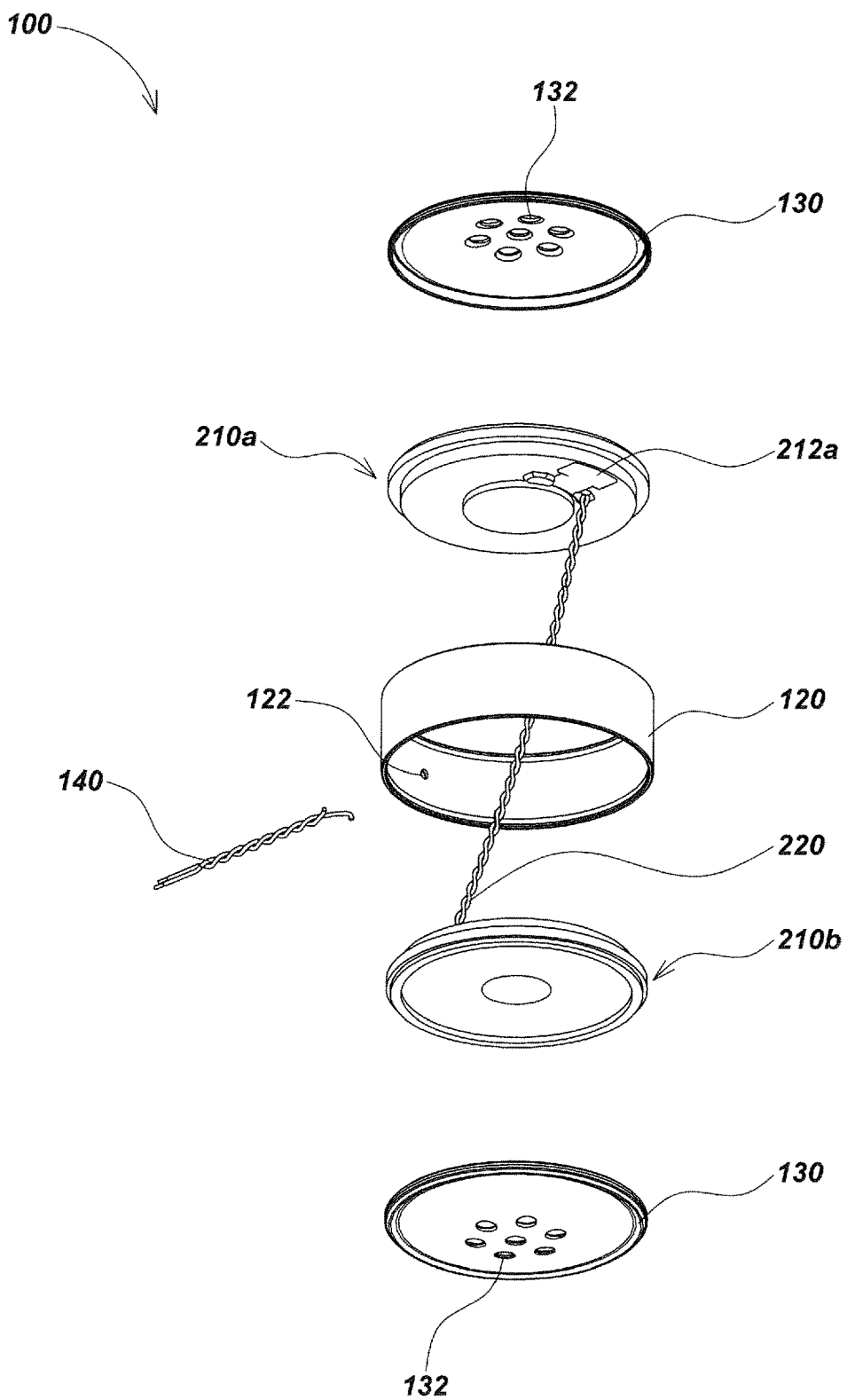
FIG. 2B illustrates the audio speaker embodiment of FIG. 1 in a bottom-up isometric exploded view

As illustrated in FIGS. 2A and 2B, the loudspeaker driver embodiments 210a and 210b may be two of the same or similarly constructed loudspeaker driver elements having identical or similar magnetic field characteristics over a desired range of frequencies, and having the same or similar electromagnetic responses to electrical signals (e.g., over a range of frequencies that are to be attenuated to avoid magnetic field interference with other components of an associated system, such as a utility locator or other magnetic field sensing device).

The loudspeaker drivers may be oriented with magnet components having opposing magnetic polarities to repel them from one another and cancel opposing dipole fields, thereby creating a magnetic quadrupole field. In other audio speaker device embodiments, multiple pairs of loudspeakers may be used, wherein the pairs are arranged with opposing magnetic polarities to cancel magnetic fields. Other structural and topological driver relationships that interact to cancel all or part of magnetic fields in all or some particular directions may also be used in alternate embodiments.

To aid in magnetic field cancellation, loudspeaker driver elements 210a and 210b may be closely seated and oriented back to back, and may further be positioned about a shared axis (e.g. axis 410 illustrated in FIG. 4A) such as shown in audio speaker device embodiment 100. As illustrated in FIGS. 2A and 2B, loudspeaker drivers 210a and 210b may be wired in parallel via wiring such as a twisted pair of wires 220 as shown. Another twisted pair of wires 140 may be electrically connected to each terminal on terminals 212a as is commonly done with speaker driver electrical connections. One wire of the twisted pair of wires 220 may further connect to each terminal on terminals 212a on one end and also connect to each terminal of terminals 212b on the other.

In some embodiments, the drivers 210a and 210b may be wired in parallel, with wires connecting to terminals 212b rather than 212a. In other embodiments, loudspeaker drivers may be wired in series. For example, in embodiments where loudspeaker drivers have been wired in series, one wire from a first twisted pair of wires (which may be wires 140 as shown) may connect to one terminal of each terminal set on each loudspeaker. In such embodiments, each wire is connected to particular terminals of the set of terminals on each driver so that when supplied with an electrical signal, the voice coil of each loudspeaker moves outward or inward in unison (i.e., in phase). When wired in series, an additional wire may be connected between the other terminal from each set of terminals on each loudspeaker driver not connected by the wire from the first twisted pair.

Figure 7A:
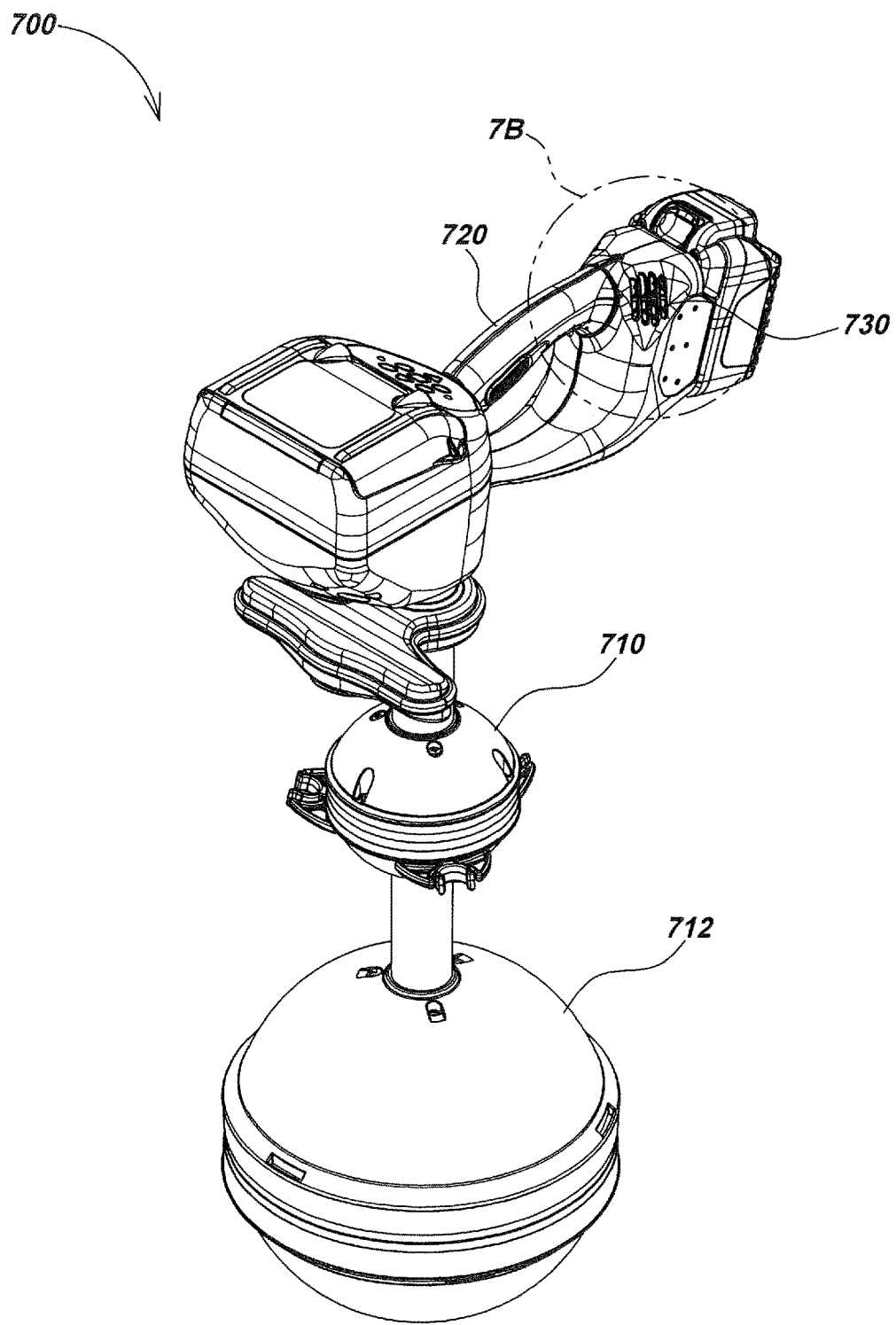
FIG. 7A illustrates details of a utility locator embodiment with loudspeakers.

As shown in audio speaker device 100, electrical signals may be conductively coupled via twisted pair 140 from an external source (e.g. utility locator 700 of FIG. 7A configured to provide an electrical signal via an audio amplifier from a signal generator or other audio signal source—it is noted that in some embodiments, signals outside of the normal audible human sound range may be provided to drivers and in the case where these signals can cause interference at inaudible frequencies (either supersonic or subsonic) similar configurations for magnetic field cancellation may also be used).

Figure 3A:
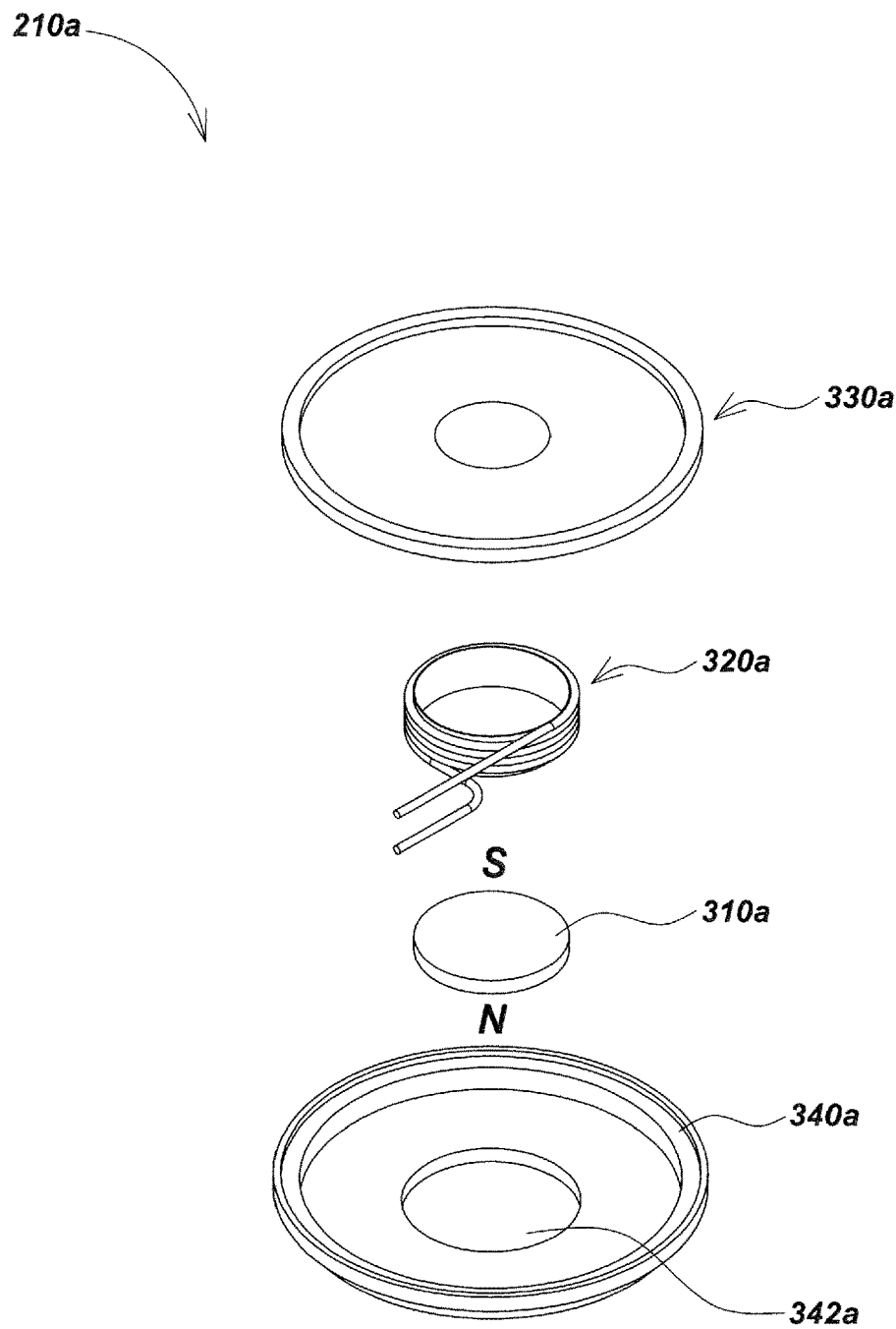
FIG. 3A illustrates a loudspeaker embodiment in exploded view.
Figure 3B:
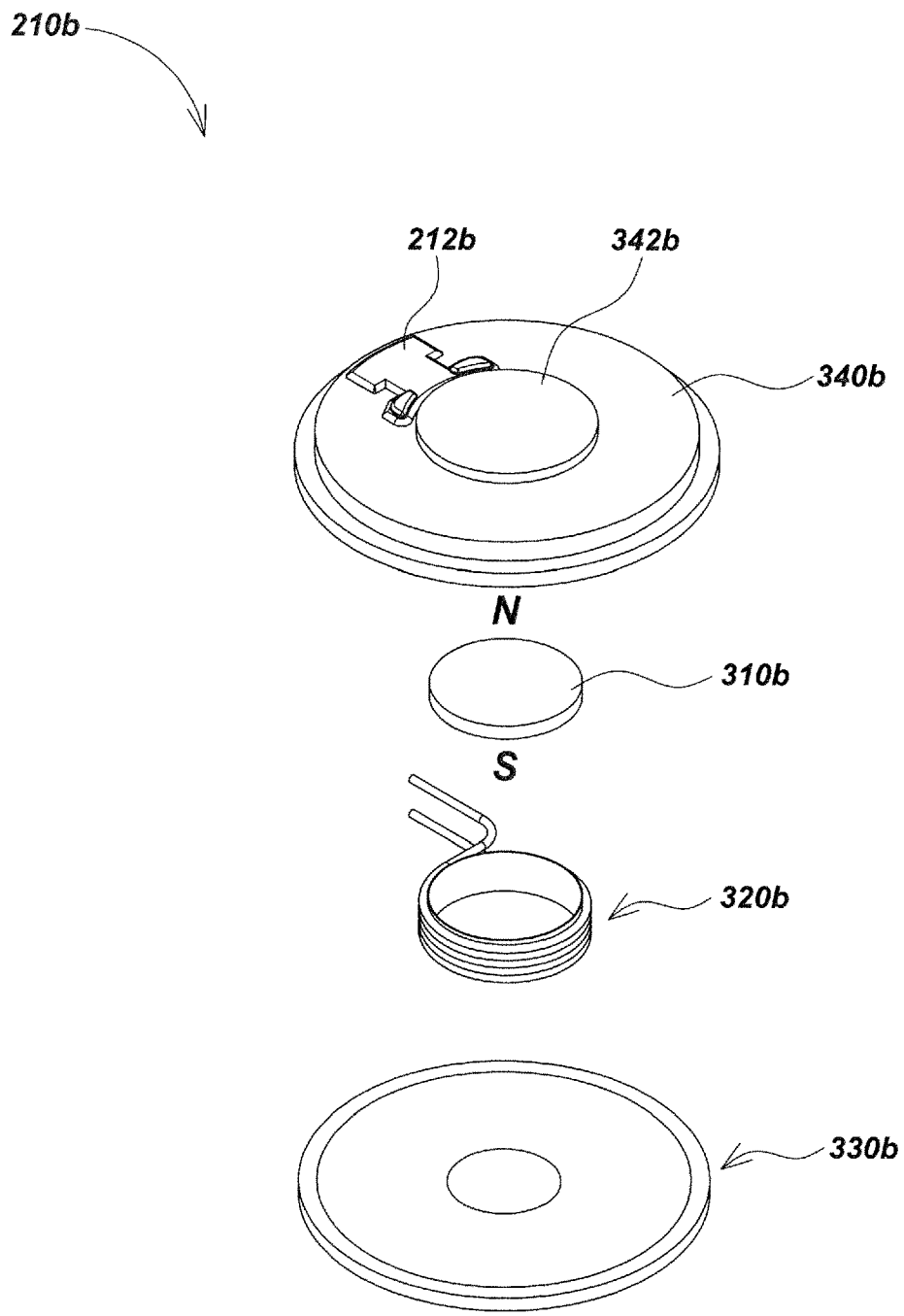
FIG. 3B illustrates another loudspeaker embodiment in exploded view.

Drivers 210a and 210b may seat within housing 120 with wires 220 pushed to one side or the other so that the back sides of pole components 342a and 342b illustrated in FIGS. 3A and 3B respectively are close together or directly touch. As illustrated in detail in FIG. 4B, a toroidal groove feature 420 formed along a top and bottom inner circumference of housing 120 may be dimensioned to snugly fit a lip feature 430 formed along the circumference on the cap 130. The cap 130 may secure to housing 120 by seating the lip feature 430 of cap 130 into groove feature 420 of housing 120. Adhesives may be used to secure the loudspeaker 210a and cap 130 and/or housing 120 together. Likewise, the cap 130 may secure to housing 120 about the loudspeaker 210 via an identical or similar groove feature 420 formed along the bottom (not illustrated) inner circumference of housing 120, allowing the lip feature 430 to seat therein.

Turning to FIGS. 3A and 3B, the loudspeaker driver embodiments 210a (shown in FIG. 3A) and 210b (shown in FIG. 3B) may be of the same or similar type. The drivers may be electrodynamic drivers for converting electrical sound signals into sound waves (i.e., motion of air or other media in which the drivers are placed). Each may have a corresponding magnet 310a, 310b and voice coil 320a, 320b (comprising a wire coil and optionally additional elements), respectively. Drivers 210a and 210b may also each have a diaphragm 330a, 330b (movable to generate air movement), and a backing components 340a, 340b, respectively. The magnets 310a, 310b and voice coils 320a, 320b are positioned in assembly so that when an electrical sound signal (current signal) flows in voice coils 320a, 320b, the resulting electromagnetic field therefrom interacts with the magnetic field from their respective magnets 310a, 310b, to cause either an attractive or repulsive motion corresponding to the supplied electrical signal.

As the electrical signal changes in amplitude and frequency, the voice coils 320a and 320b move in an analogous fashion, and, in turn, when mechanically coupled to respective diaphragms 330a and 330b produce air motion/sound. Other loudspeaker drivers as known or developed in the art may be used in alternate embodiments to effect conversion of electrical energy to sound by similar or equivalent magnetic field cancellation techniques as described herein.

In exemplary driver embodiments 210a and 210b, magnets 310a and 310b may have a permanent magnets, may be cylindrical in shape, and may adhere or otherwise secure within a cavity formed within pole components 342a and 342b of backing components 340a and 340b, respectively. In assembly, a gap may be formed between pole components 342a, 342b and magnets 310a, 310b, with the gap dimensioned to allow respective voice coils 320a, 320b to fit within.

FIGS. 3A and 3A show details of a pair of exemplary loudspeaker driver elements in mirror image position as they may be assembled in typical embodiments. As shown in FIG. 3A and FIG. 3B, each voice coil 320a, 320b may be secured/mechanically coupled to their respective diaphragm 330a, 330b so that the voice coils 320a, 320b seat within the gap formed between pole components 342a, 342b, and magnets 310a, 310b in assembly. The voice coils 320a, 320b may be electrically connected to each terminal of their respective terminals 212a, 212b. In other embodiments, other arrangements and shapes of magnets, voice coils, diaphragms, pole components, and/or other loudspeaker driver elements may be used. Likewise, in other embodiments, other types of speakers may be used.

Each pole component 342a, 342b may be shaped and oriented to affect the electromagnetic field emitted from corresponding voice coils 320a, 320b. For example, each pole component may be shaped and sized as shown in FIG. 3A and FIG. 3B to concentrate and direct the magnetic fields of their corresponding magnet 310a, 310b (so as to control how they interact with electromagnetic fields emitted by voice coils 320a, 320b when driven by an electrical signal). In alternate embodiments, pole components may be of other shapes, sizes, and/or dimensions, and/or may utilize various materials. In some such embodiments, the pole components may be configured to further control or lessen the amount of electromagnetic fields emitted by the voice coils in particular directions; this may be used to minimize the electromagnetic signature to avoid interfere with other devices, such as utility locators.

Figure 4A:
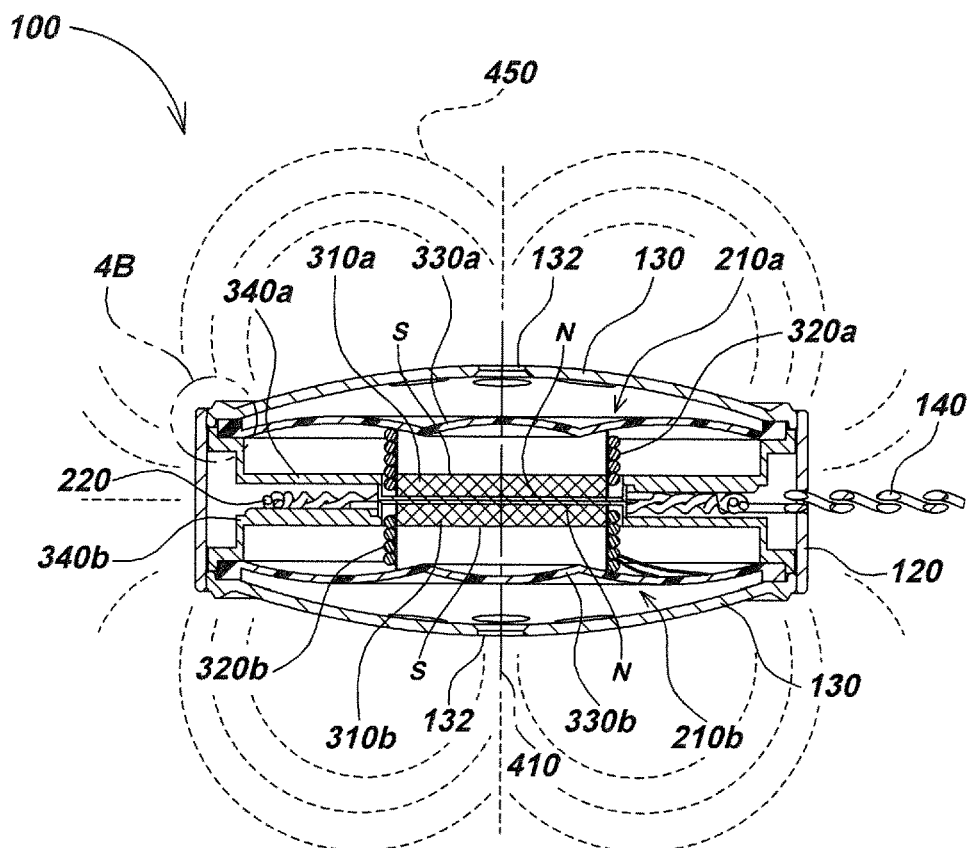
FIG. 4A illustrates the audio speaker embodiment of FIG. 1 in sectional view along line 4A-4A.
Figure 4B:
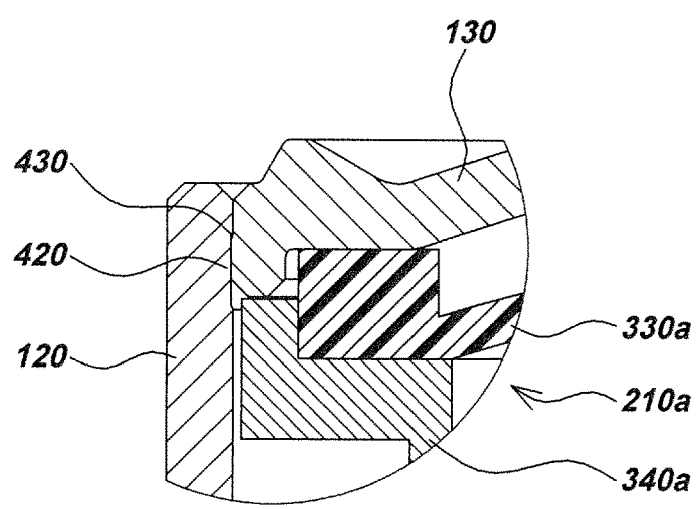
FIG. 4B illustrates details of a portion of the embodiment of FIG. 4A showing the enclosure components securing together.

Turning to FIG. 4A, loudspeaker driver embodiments 210a and 210b may be positioned back to back and closely together as shown so that magnet 310a of driver 210a is oriented in polar opposition to the magnet 310b of driver 210b. Likewise, voice coil 320a of driver 210a may be oriented in polar opposition to the voice coil 320b of driver 210b when each is supplied with an electrical signal or signals. The orientation of magnets 310a and 310b and voice coils 320a and 320b in polar opposition may be on a common axis 410 such that magnetic fields emitted from loudspeakers 210a and 210b cancel. Cancellation of the dipole fields in this way results in a quadrupole field 450, which advantageously falls off more rapidly with distance than the dipole field generated by typical loudspeakers.

Figure 5A:
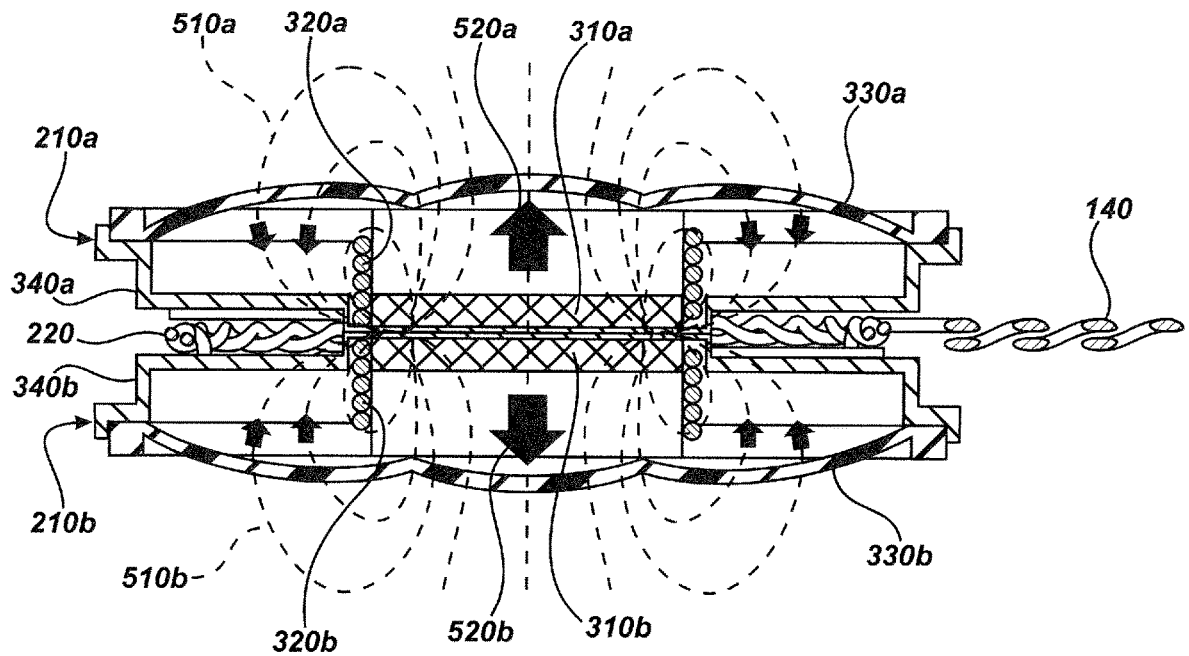
FIG. 5A illustrates details of the embodiment of FIG. 4A, without the enclosure, showing electromagnetic fields from the voice coils and corresponding diaphragm movement in sectional view.
Figure 5B:
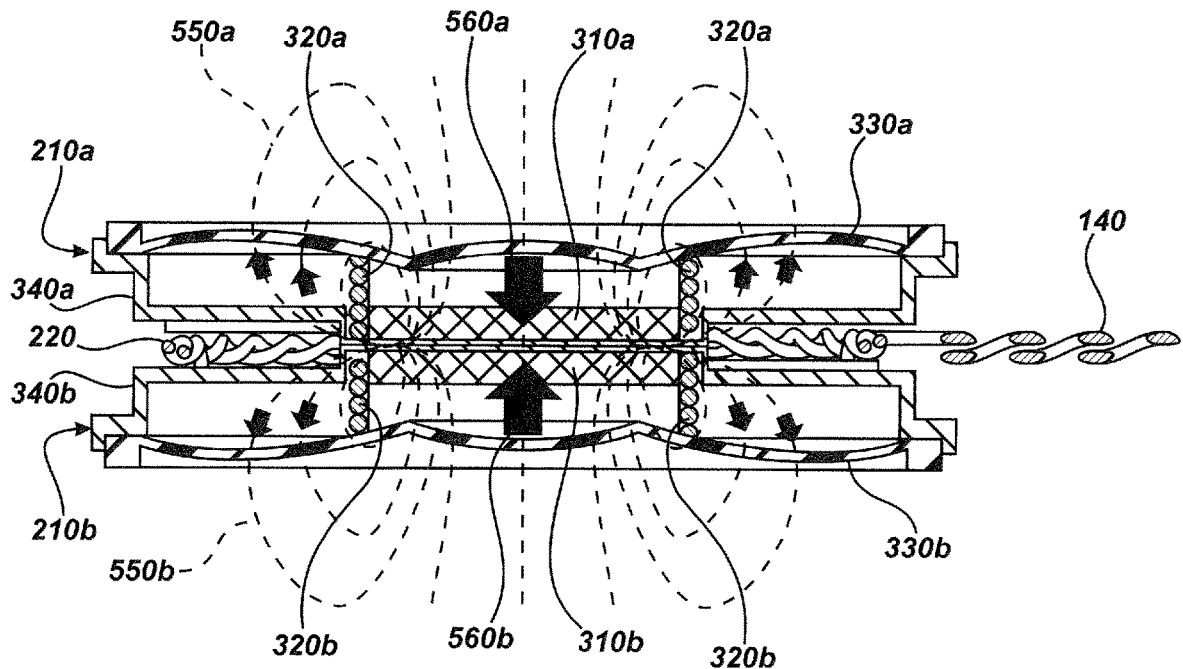
FIG. 5B illustrates details of the embodiment of FIG. 4A, without the enclosure, showing a change in electromagnetic field from the voice coils and corresponding diaphragm movement in sectional view.

FIG. 5A and FIG. 5B illustrate example magnetic field signatures in an exemplary paired loudspeaker driver assembly. Electromagnetic fields from opposite voice coils, such as electromagnetic fields 510a, 510b of FIG. 5A, and 550a, 550b of FIG. 5B, emitted from voice coils 320a, 320b when energized, are largely the same in shape and magnitude, but are oriented in polar opposition such that they cancel. As the electrical signals provided to each driver 210a and 210b change, diaphragms 330a and 330b push outward in directions 520a and 520b (as shown in FIG. 5A) or inward in directions 560a and 560b (as shown in FIG. 5B), producing sound. The corresponding electromagnetic fields 510a and 510b or 550a and 550b from voice coils 320a and 320b also change in unison to maintain like opposition in polarity in magnitude and magnetic field shape.

In various embodiments, orientations of magnets within loudspeaker driver pairs (or assemblies with more than two or an odd number of driver elements), directions of windings on one or more voice coils, and/or direction in which signal is driven through voice coils, may be varied so as to fully or partially cancel electromagnetic fields from other (e.g., oppositely position) drivers. In some such embodiments, the driver elements or other speaker components may be arranged so that the polarity of magnetic fields are cancelled while the diaphragms of opposing loudspeakers move in unison in a common direction, while the electromagnetic fields therefrom are fully or partially cancelled over at least a desired range of frequencies.

Figure 6A:
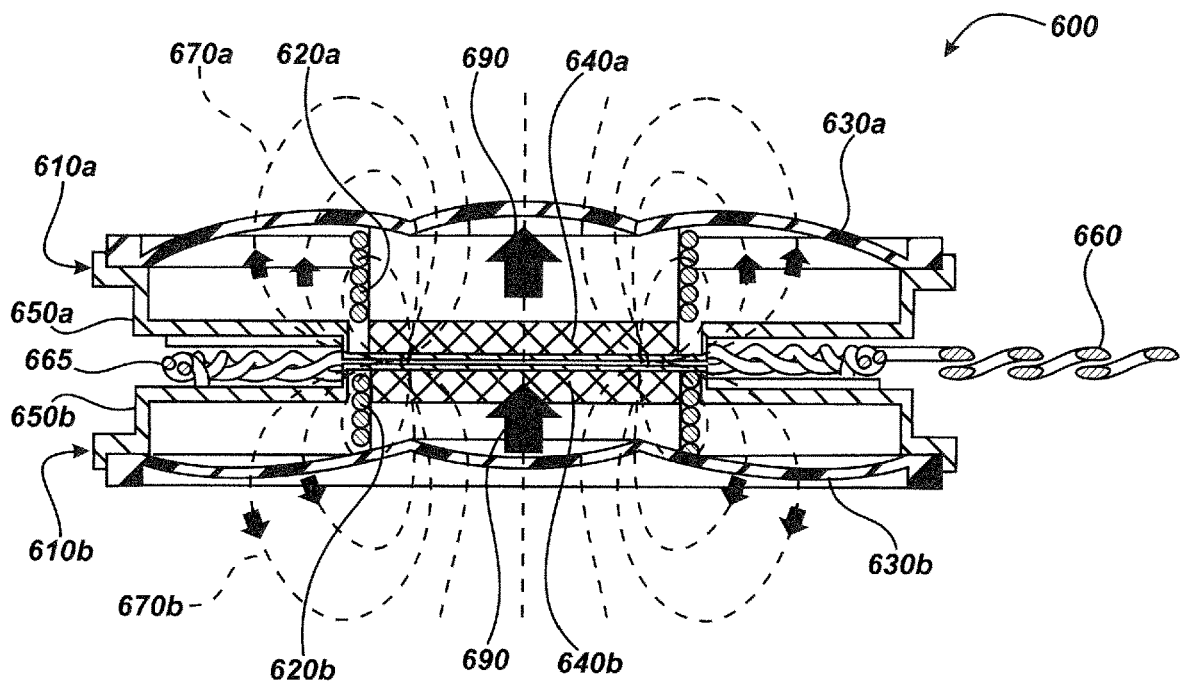
FIG. 6A illustrates details of an embodiment similar to that of FIG. 5A but without an enclosure, having voice coils to move the diaphragms of opposing loudspeakers in the same direction.
Figure 6B:
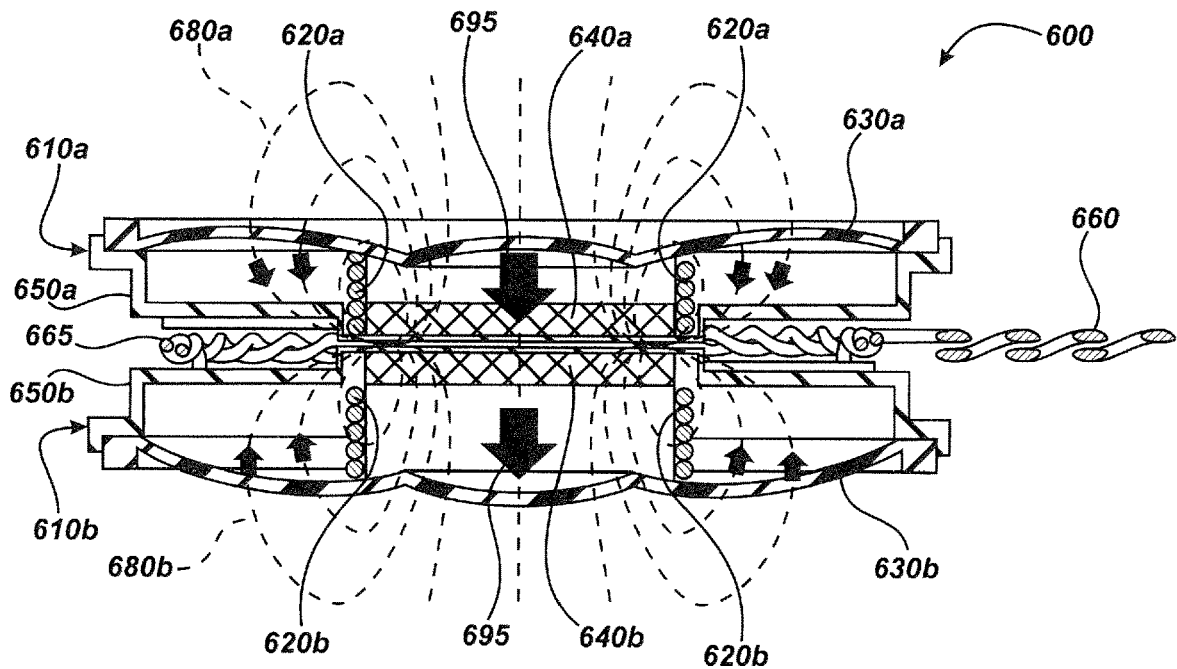
FIG. 6B illustrates details of the embodiment of FIG. 6A in sectional view, illustrating a change in electromagnetic field from the voice coils and corresponding diaphragm movement in the same direction in opposing loudspeakers.

As illustrated in FIGS. 6A and 6B, an audio speaker device embodiment 600 may be similar in structure and components to the audio speaker device embodiment 100 of FIGS. 1-5B. For example, embodiment 600 includes a pair of loudspeakers 610a, 610b each with a voice coil 620a, 620b secured to a diaphragm 630a, 630b. Each voice coil 620a, 620b may be positioned to interact when driven with the magnetic field of a corresponding permanent magnet 640a, 640b within a backing component 650a, 650b when a signal is driven through wiring 660 and 665. Each voice coil 620a, 620b, when supplied with an electrical sound signal, may generate a corresponding electromagnetic field 670a, 670b (as shown in FIG. 6A) or 680a, 680b (as shown in FIG. 6B) causing a corresponding movement in direction 690 or 695.

In speaker embodiment 600, the components may be arranged so that the polarity of magnetic and electromagnetic fields (i.e., electromagnetic fields 670a, 670b in FIG. 6A and 680a, 680b in FIG. 6B) are such that diaphragms 630a and 630b of opposing loudspeakers 610a and 610b move in unison in a common direction 690 in FIG. 6A or 695 in FIG. 6B, while the electromagnetic fields 670a and 670b in FIG. 6A or 680a and 680b in FIG. 6B therefrom cancel. For example, in audio speaker device embodiment 600, orientations of magnets 640a and 640b in loudspeakers 610a and 610b, respectively, are aligned to attract such that corresponding voice coils 620a and 620b move in unison in a common direction when supplied with an electrical signal.

In other embodiments, directions of windings or directions in which an electrical signal is driven through one voice coil may be configured to produce a geometry where polarities of voice coils and magnets allow the diaphragm of opposing loudspeakers to move in unison in a common direction.

The audio speaker device embodiments described herein have a reduced magnetic signature while providing high quality dynamic sound over a desired range of frequencies (typically within the audible human range, but in some applications over higher (ultrasonic) and/or lower (infrasonic) frequencies). As such, audio speaker device embodiments in accordance with various aspects of the present disclosure may be used in various devices and systems that are used to detect or measure magnetic signals across a range of magnetic signal frequencies, particularly where providing quality dynamic sound (or ultrasound or infra-sound) to a user is needed or otherwise advantageous In an exemplary embodiment, audio speaker device embodiments such as are described herein may be used with a magnetic field sensing buried utility locator device. Examples of various locator devices and associated system components are described in the co-assigned applications incorporated herein. For example, exemplary utility locator embodiment 700 of FIG. 7A includes magnetic field antenna arrays 710 and 712 to receive AC magnetic field signals across a range of frequencies and provide corresponding output electrical signals corresponding to the received magnetic fields. These output electrical signals are then processed in electronic circuits, including one or more processing elements, to determine information about hidden or buried utility or other current carrying conductors (based on the magnetic fields resulting from current flow therein. Examples and details of embodiments of such antennas and signal processing are described in the incorporated applications.

The locator may then store the determined information as well as communicate information about the buried object or utility, or about locator operation, to a user or users. Existing loudspeakers, particularly those used in locators, normally generate electromagnetic signals at frequencies that overlap to some extent with the range of frequencies the locator is trying to sense and process. To address this problem, audio speaker devices in accordance with various aspects of the present disclosure (e.g., audio speaker device 750 of FIG. 7B) have attenuated magnetic field signatures, which may eliminate or reduce interfere with magnetic field signals received at locator antenna arrays 710 and 712.

In addition, utility locator 700 may communicate information to a user or users through audible indicators across a range of frequencies, such as those required to reproduce human speech or other human audible sounds. For example, a locator may include audio electronics to generate audio output signals based on information determined by the locator about the buried object or buried utility or other information, such as information related to operation of the locator or other devices. The audio electronics may be operatively coupled to or integrated in the locator electronics.

Details of example locating devices that may be combined with the loudspeaker device embodiments herein in further locator embodiments, as well as additional components, methods, and configurations that may be used in conjunction with the embodiments described herein, are disclosed in co-assigned patents and patent applications including: U.S. Pat. No. 7,009,399, issued Mar. 7, 2006, entitled OMNIDIRECTIONAL SONDE AND LINE LOCATOR; U.S. Pat. No. 7,136,765, issued Nov. 14, 2006, entitled A BURIED OBJECT LOCATING AND TRACING METHOD AND SYSTEM EMPLOYING PRINCIPAL COMPONENTS ANALYSIS FOR BLIND SIGNAL DETECTION; U.S. Pat. No. 7,221,136, issued May 22, 2007, entitled SONDES FOR LOCATING UNDERGROUND PIPES AND CONDUITS; U.S. Pat. No. 7,276,910, issued Oct. 2, 2007, entitled COMPACT SELF-TUNED ELECTRICAL RESONATOR FOR BURIED OBJECT LOCATOR APPLICATIONS; U.S. Pat. No. 7,288,929, issued Oct. 30, 2007, entitled INDUCTIVE CLAMP FOR APPLYING SIGNAL TO BURIED UTILITIES; U.S. Pat. No. 7,332,901, issued Feb. 19, 2008, entitled LOCATOR WITH APPARENT DEPTH INDICATION; U.S. Pat. No. 7,336,078, issued Feb. 26, 2008, entitled MULTI-SENSOR MAPPING OMNIDIRECTIONAL SONDE AND LINE LOCATORS; U.S. Pat. No. 7,557,559, issued Jul. 7, 2009, entitled COMPACT LINE ILLUMINATOR FOR LOCATING BURIED PIPES AND CABLES; U.S. Pat. No. 7,619,516, issued Nov. 17, 2009, entitled SINGLE AND MULTI-TRACE OMNIDIRECTIONAL SONDE AND LINE LOCATORS AND TRANSMITTER USED THEREWITH; U.S. Pat. No. 7,733,077, issued Jun. 8, 2010, entitled MULTI-SENSOR MAPPING OMNIDIRECTIONAL SONDE AND LINE LOCATORS AND TRANSMITTER USED THEREWITH; U.S. Pat. No. 7,741,848, issued Jun. 22, 2010, entitled ADAPTIVE MULTICHANNEL LOCATOR SYSTEM FOR MULTIPLE PROXIMITY DETECTION; U.S. Pat. No. 7,755,360, issued Jul. 13, 2010, entitled PORTABLE LOCATOR SYSTEM WITH JAMMING REDUCTION; U.S. Pat. No. 9,625,602, issued Apr. 18, 2017, entitled SMART PERSONAL COMMUNICATION DEVICES AS USER INTERFACES; U.S. Pat. No. 7,830,149, issued Nov. 9, 2010, entitled AN UNDERGROUND UTILITY LOCATOR WITH A TRANSMITTER, A PAIR OF UPWARDLY OPENING POCKETS AND HELICAL COIL TYPE ELECTRICAL CORDS; U.S. Pat. No. 7,969,151, issued Jun. 28, 2011, entitled PRE-AMPLIFIER AND MIXER CIRCUITRY FOR A LOCATOR ANTENNA; U.S. Pat. No. 8,013,610, issued Sep. 6, 2011, entitled HIGH-Q SELF TUNING LOCATING TRANSMITTER; U.S. Pat. No. 8,203,343, issued Jun. 19, 2012, entitled RECONFIGURABLE PORTABLE LOCATOR EMPLOYING MULTIPLE SENSOR ARRAY HAVING FLEXIBLE NESTED ORTHOGONAL ANTENNAS; U.S. Pat. No. 8,248,056, issued Aug. 21, 2012, entitled BURIED OBJECT LOCATOR SYSTEM EMPLOYING AUTOMATED VIRTUAL DEPTH EVENT DETECTION AND SIGNALING; U.S. Pat. No. 9,599,499, issued Mar. 21, 2017, entitled SYSTEMS AND METHODS FOR LOCATING BURIED OR HIDDEN OBJECTS USING SHEET CURRENT FLOW MODELS; U.S. Pat. No. 8,264,226, issued Sep. 11, 2012, entitled SYSTEM AND METHOD FOR LOCATING BURIED PIPES AND CABLES WITH A MAN PORTABLE LOCATOR AND A TRANSMITTER IN A MESH NETWORK; U.S. Pat. No. 9,638,824, issued May 2, 2017, entitled QUAD-GRADIENT COILS FOR USE IN LOCATING SYSTEMS; U.S. patent application Ser. No. 13/677,223, filed Nov. 14, 2012, entitled MULTI-FREQUENCY LOCATING SYSTEMS AND METHODS; U.S. patent application Ser. No. 13/769,202, filed Feb. 15, 2013, entitled SMART PAINT STICK DEVICES AND METHODS; U.S. patent application Ser. No. 13/774,351, filed Feb. 22, 2013, entitled DOCKABLE TRIPODAL CAMERA CONTROL UNIT; U.S. patent application Ser. No. 13/787,711, filed Mar. 6, 2013, entitled DUAL SENSED LOCATING SYSTEMS AND METHODS; U.S. Pat. No. 8,400,154, issued Mar. 19, 2013, entitled LOCATOR ANTENNA WITH CONDUCTIVE BOBBIN; U.S. Pat. No. 9,488,747, issued Nov. 8, 2016, entitled DUAL ANTENNA SYSTEMS WITH VARIABLE POLARIZATION; U.S. patent application Ser. No. 13/894,038, filed May 14, 2013, entitled OMNI-INDUCER TRANSMITTING DEVICES AND METHODS; U.S. patent application Ser. No. 13/958,492, filed Aug. 2, 2013, entitled OPTICAL ROUND TRACKING APPARATUS, SYSTEMS AND METHODS; U.S. Pat. No. 9,599,740, issued Mar. 21, 2017, entitled USER INTERFACES FOR UTILITY LOCATORS; U.S. patent application Ser. No. 14/027,027, filed Sep. 13, 2013, entitled SONDE DEVICES INCLUDING A SECTIONAL FERRITE CORE STRUCTURE; U.S. application Ser. No. 14/077,022, filed Nov. 11, 2013, entitled WEARABLE MAGNETIC FIELD UTILITY LOCATOR SYSTEM WITH SOUND FIELD GENERATION; U.S. Pat. No. 8,547,428, issued Oct. 1, 2013, entitled PIPE MAPPING SYSTEM; U.S. Pat. No. 8,635,043, issued Jan. 21, 2014, entitled Locator and Transmitter Calibration System; U.S. patent application Ser. No. 14/332,268, filed Jul. 15, 2014, entitled UTILITY LOCATOR TRANSMITTER DEVICES, SYSTEMS, AND METHODS WITH DOCKABLE APPARATUS; U.S. patent application Ser. No. 14/446,145, filed Jul. 29, 2014, entitled UTILITY LOCATING SYSTEMS WITH MOBILE BASE STATION; U.S. Pat. No. 9,632,199, issued Apr. 25, 2017, entitled INDUCTIVE CLAMP DEVICES, SYSTEMS, AND METHODS; U.S. patent application Ser. No. 14/516,558, filed Oct. 16, 2014, entitled ELECTRONIC MARKER DEVICES AND SYSTEMS; U.S. patent application Ser. No. 14/580,097, filed Dec. 22, 2014, entitled NULLED-SIGNAL LOCATING DEVICES, SYSTEMS, AND METHODS; U.S. Pat. No. 9,057,754, issued Jun. 16, 2015, entitled ECONOMICAL MAGNETIC LOCATOR APPARATUS AND METHOD; U.S. patent application Ser. No. 14/752,834, filed Jun. 27, 2015, entitled GROUND TRACKING APPARATUS, SYSTEMS, AND METHODS; U.S. patent application Ser. No. 14/797,840, filed Jul. 13, 2015, entitled GROUND-TRACKING DEVICES AND METHODS FOR USE WITH A UTILITY LOCATOR; U.S. patent application Ser. No. 14/798,177, filed Jul. 13, 2015, entitled MARKING PAINT APPLICATOR FOR USE WITH PORTABLE UTILITY LOCATOR; U.S. Pat. No. 9,081,109, issued Jul. 14, 2015, entitled GROUND-TRACKING DEVICES FOR USE WITH A MAPPING LOCATOR; U.S. Pat. No. 9,082,269, issued Jul. 14, 2015, entitled HAPTIC DIRECTIONAL FEEDBACK HANDLES FOR LOCATION DEVICES; U.S. patent application Ser. No. 14/802,791, filed Jul. 17, 2015, entitled METHODS AND SYSTEMS FOR SEAMLESS TRANSITIONING IN INTERACTIVE MAPPING SYSTEMS; U.S. Pat. No. 9,085,007, issued Jul. 21, 2015, entitled MARKING PAINT APPLICATOR FOR PORTABLE LOCATOR; U.S. patent application Ser. No. 14/949,868, filed Nov. 23, 2015, entitled BURIED OBJECT LOCATOR APPARATUS AND SYSTEMS; U.S. patent application Ser. No. 15/006, 119, filed Jan. 26, 2016, entitled SELF-STANDING MULTILEG ATTACHMENT DEVICES FOR USE WITH UTILITY LOCATORS; U.S. Pat. No. 9,341,740, issued May 17, 2016, entitled OPTICAL GROUND TRACKING APPARATUS, SYSTEMS, AND METHODS; U.S. Provisional Patent Application 62/350,147, filed Jun. 14, 2016, entitled TRACKABLE DIPOLE DEVICES, METHODS, AND SYSTEMS FOR USE WITH MARKING PAINT STICKS; U.S. Provisional Patent Application 62/352,731, filed Jun. 21, 2016, entitled SYSTEMS AND METHODS FOR UNIQUELY IDENTIFYING BURIED UTILITIES IN A MULTI-UTILITY ENVIRONMENT; U.S. Pat. No. 9,411,067, issued Aug. 9, 2016, entitled GROUND-TRACKING SYSTEMS AND APPARATUS; U.S. patent application Ser. No. 15/247,503, filed Aug. 25, 2016, entitled LOCATING DEVICES, SYSTEMS, AND METHODS USING FREQUENCY SUITES FOR UTILITY DETECTION; U.S. patent application Ser. No. 15/250,666, filed Aug. 29, 2016, entitled PHASE-SYNCHRONIZED BURIED OBJECT TRANSMITTER AND LOCATOR METHODS AND APPARATUS; U.S. Pat. No. 9,435,907, issued Sep. 6, 2016, entitled PHASE SYNCHRONIZED BURIED OBJECT LOCATOR APPARATUS, SYSTEMS, AND METHODS; U.S. Pat. No. 9,465,129, issued Oct. 11, 2016, entitled IMAGE-BASED MAPPING LOCATING SYSTEM; U.S. patent application Ser. No. 15/331,570, filed Oct. 21, 2016, entitled KEYED CURRENT SIGNAL UTILITY LOCATING SYSTEMS AND METHODS; U.S. patent application Ser. No. 15/339,766, filed Oct. 31, 2016, entitled GRADIENT ANTENNA COILS AND ARRAYS FOR USE IN LOCATING SYSTEMS; U.S. patent application Ser. No. 15/345,421, filed Nov. 7, 2016, entitled OMNI-INDUCER TRANSMITTING DEVICES AND METHODS; U.S. patent application Ser. No. 15/360,979, filed Nov. 23, 2016, entitled UTILITY LOCATING SYSTEMS, DEVICES, AND METHODS USING RADIO BROADCAST SIGNALS; U.S. patent application Ser. No. 15/376,576, filed Dec. 12, 2016, entitled MAGNETIC SENSING BURIED OBJECT LOCATOR INCLUDING A CAMERA; U.S. Provisional Patent Application 62/435,681, filed Dec. 16, 2016, entitled SYSTEMS AND METHODS FOR ELECTRONICALLY MARKING AND LOCATING BURIED UTILITY ASSETS; United States Provisional Patent Application 62/438,069, filed Dec. 22, 2016, entitled SYSTEMS AND METHODS FOR ELECTRONICALLY MARKING, LOCATING, AND DISPLAYING BURIED UTILITY ASSETS; U.S. patent application Ser. No. 15/396,068, filed Dec. 30, 2016, entitled UTILITY LOCATOR TRANSMITTER APPARATUS AND METHODS; U.S. Provisional Patent Application 62/444,310, filed Jan. 9, 2017, entitled DIPOLE-TRACKED LASER DISTANCE MEASURING DEVICE; U.S. patent application Ser. No. 15/425,785, filed Feb. 6, 2017, entitled METHODS AND APPARATUS FOR HIGH-SPEED DATA TRANSFER EMPLOYING SELF-SYNCHRONIZING QUADRATURE AMPLITUDE MODULATION (QAM); U.S. patent application Ser. No. 15/434,056, filed Feb. 16, 2017, entitled BURIED UTILITY MARKER DEVICES, SYSTEMS, AND METHODS; U.S. patent application Ser. No. 15/457,149, filed Mar. 13, 2017, entitled USER INTERFACES FOR UTILITY LOCATOR; U.S. patent application Ser. No. 15/457,222, filed Mar. 13, 2017, entitled SYSTEMS AND METHODS FOR LOCATING BURIED OR HIDDEN OBJECTS USING SHEET CURRENT FLOW MODELS; U.S. patent application Ser. No. 15/457,897, filed Mar. 13, 2017, entitled UTILITY LOCATORS WITH RETRACTABLE SUPPORT STRUCTURES AND APPLICATIONS THEREOF; U.S. patent application Ser. No. 15/470,642, filed Mar. 27, 2017, entitled UTILITY LOCATING APPARATUS AND SYSTEMS USING MULTIPLE ANTENNA COILS; U.S. patent application Ser. No. 15/470,713, filed Mar. 27, 2017, entitled UTILITY LOCATORS WITH PERSONAL COMMUNICATION DEVICE USER INTERFACES; U.S. patent application Ser. No. 15/483,924, filed Apr. 10, 2017, entitled SYSTEMS AND METHODS FOR DATA TRANSFER USING SELF-SYNCHRONIZING QUADRATURE AMPLITUDE MODULATION (QAM); U.S. patent application Ser. No. 15/485,082, filed Apr. 11, 2017, entitled MAGNETIC UTILITY LOCATOR DEVICES AND METHODS; U.S. patent application Ser. No. 15/485,125, filed Apr. 11, 2017, entitled INDUCTIVE CLAMP DEVICES, SYSTEMS, AND METHODS; U.S. patent application Ser. No. 15/490,740, filed Apr. 18, 2017, entitled NULLED-SIGNAL UTILITY LOCATING DEVICES, SYSTEMS, AND METHODS; U.S. patent application Ser. No. 15/497,040, filed Apr. 25, 2017, entitled SYSTEMS AND METHODS FOR LOCATING AND/OR MAPPING BURIED UTILITIES USING VEHICLE-MOUNTED LOCATING DEVICES; U.S. patent application Ser. No. 15/590,964, filed May 9, 2017, entitled BORING INSPECTION SYSTEMS AND METHODS; U.S. patent application Ser. No. 15/623,174, filed Jun. 14, 2017, entitled TRACKABLE DIPOLE DEVICES, METHODS, AND SYSTEMS FOR USE WITH MARKING PAINT STICKS; U.S. patent application Ser. No. 15/626,399, filed Jun. 19, 2017, entitled SYSTEMS AND METHODS FOR UNIQUELY IDENTIFYING BURIED UTILITIES IN A MULTI-UTILITY ENVIRONMENT; U.S. patent application Ser. No. 15/633,682, filed Jun. 26, 2017, entitled BURIED OBJECT LOCATING DEVICES AND METHODS; U.S. patent application Ser. No. 15/681,409, filed Aug. 20, 2017, entitled WIRELESS BURIED PIPE AND CABLE LOCATING SYSTEMS; United States Provisional Patent Application 62/564,215, filed Sep. 27, 2017, entitled MULTIFUNCTION BURIED UTILITY LOCATING CLIPS; U.S. Pat. No. 9,798,033, issued Oct. 24, 2017, entitled SONDE DEVICES INCLUDING A SECTIONAL FERRITE CORE; U.S. Provisional patent application Ser. No. 15/811,361, filed Nov. 13, 2017, entitled OPTICAL GROUND TRACKING APPARATUS, SYSTEMS, AND METHODS; and U.S. Pat. No. 9,841,503, issued Dec. 12, 2017, entitled OPTICAL GROUND TRACKING APPARATUS, SYSTEMS, AND METHODS. The content of each of the above-described patents and applications is incorporated by reference herein in its entirety. The above applications may be collectively denoted herein as the "co-assigned applications" or "incorporated applications."

Figure 7B:
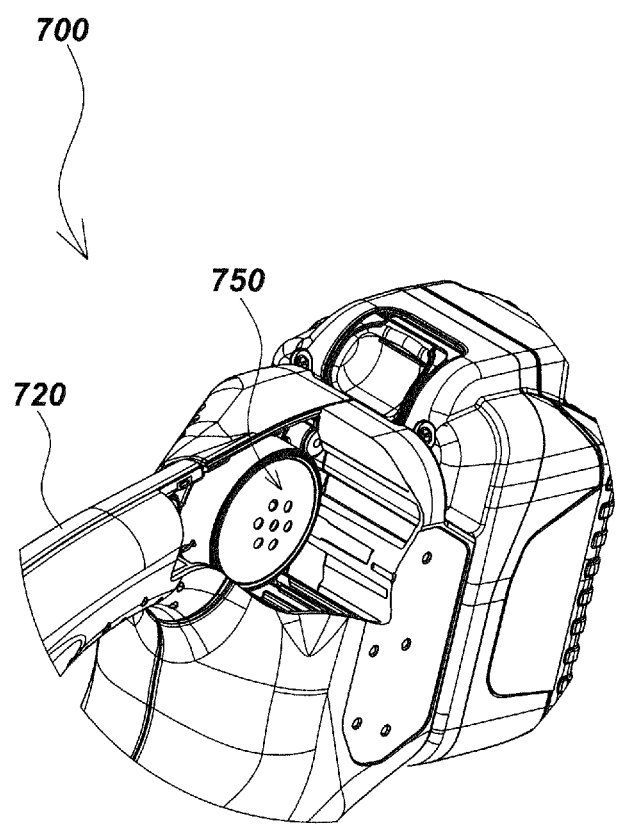
FIG. 7B illustrates details of the embodiment of FIG. 7A in cutaway view, showing an audio speaker installed within the utility locator.

Turning to FIG. 7B, a cutaway of the rear portion of a handle 720 of utility locator 700 is shown. Audio speaker device 750 is seated in a vertical orientation within the handle. The audio speaker device 750 may be of the variety disclosed previously herein or other similar or equivalent devices, and may generate sound that travels outward, exiting through sound holes 730 (FIG. 7A) formed along locator handle 720. The audio speaker device 750 may be positioned on or within the locator so that the magnetic fields emitted therefrom minimize interference with other signals within a desired frequency range that are received at antenna arrays 710 and 712.

Figure 8:
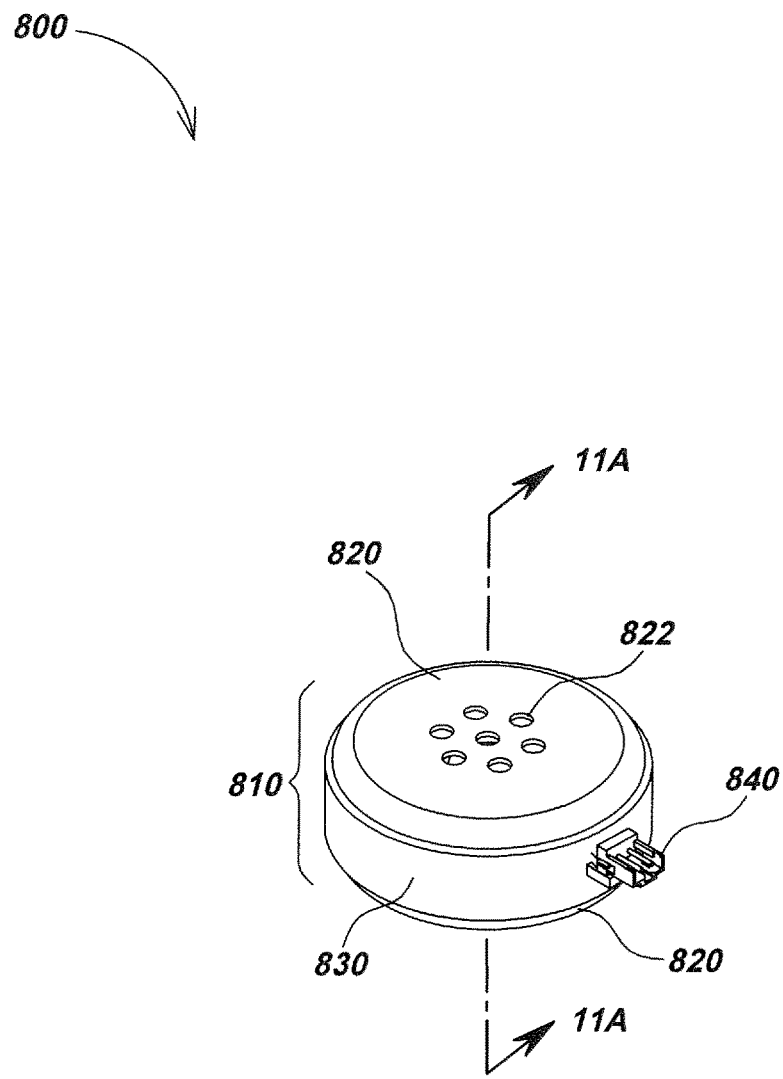
FIG. 8 is an illustration of an audio speaker device embodiment in isometric view.

FIG. 8 illustrates details of another audio speaker device embodiment. Audio speaker device embodiment 800 may include a speaker enclosure 810 having a pair of loudspeakers within (e.g., loudspeaker drivers 910a and 910b illustrated in FIG. 9, which may be similar to the other driver embodiments disclosed herein and may share similar or common components). The enclosure 810 may optionally be magnetically shielded with a material comprising tin plated mild steel or other magnetically permeable materials or other magnetic shielding materials and/or assemblies. Canceling of magnetic fields may be done by using opposing polarities in loudspeaker drivers to prevent or reduce generation of external electromagnetic fields, and thereby reduce or eliminate interfering magnetic field signatures. For example, magnets within the drivers of embodiment 800 may be positioned so that north and north or south and south polarities face one another, thereby creating a magnetic quadrupole. As noted previously, the fields of this magnetic quadrupole advantageously fall off more rapidly with distance than a dipole field as results from typical loudspeakers.

Figure 9:
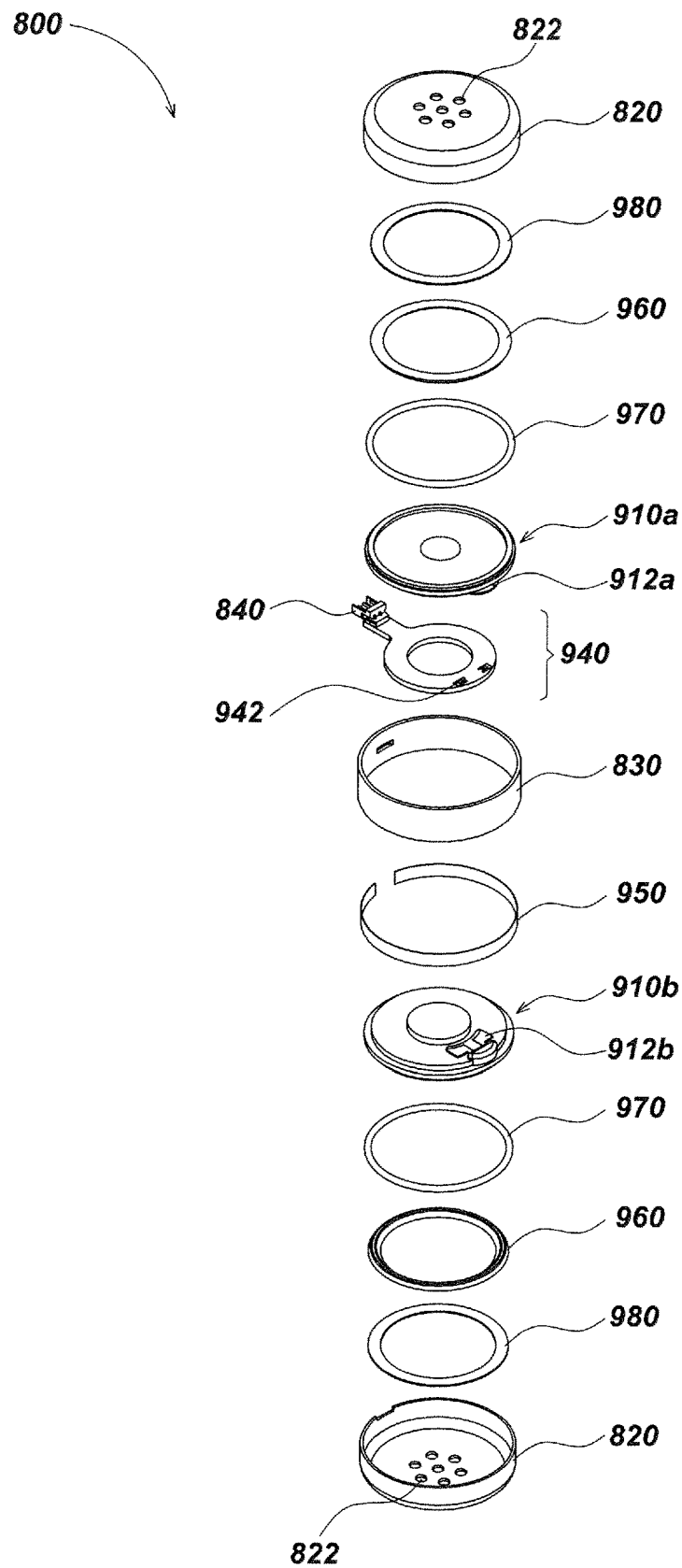
FIG. 9 is an exploded view of the audio speaker of FIG. 8.

Enclosure 810 may include two housing components 820 that secure together with a securing band 830 that, in combination with a tape seal 950 (as shown in FIG. 9), seals where the two housing components 820 mate together. The securing band 830 may be made of rubber or other elastomeric material that may aid in holding the two housing components 820 together. A connector 840 may extend from within enclosure 810, allowing electrical signals from an external sound signal source (e.g., a utility locator sound generator and audio amplifier) to pass through the enclosure and to the loudspeaker drivers 910a and 910b within enclosure 810. Each of the housing elements 820 may be formed having a series of sound hole features 822. The sound hole features 822 may be included to allow sound generated within enclosure 810 to effectively travel to the exterior environment, while still allowing optional magnetic shielding of the enclosure 810 to provide a path for the magnetic fields emitted from loudspeakers 910a and 910b and aid in containing magnetic fields therein.

FIG. 9 illustrates details of a loudspeaker drive element embodiment 900. Driver embodiments 910a and 910b may be two of the same or similarly constructed devices having identical or similar magnetic field characteristics over a targeted range of frequencies, and the same or similar electromagnetic responses to electrical signals. The loudspeaker drivers 910a and 910b may be oriented with opposing magnetic polarities such as described previously herein so as to repel each other and cancel the opposing dipole fields, resulting in a magnetic quadrupole.

Figure 11A:
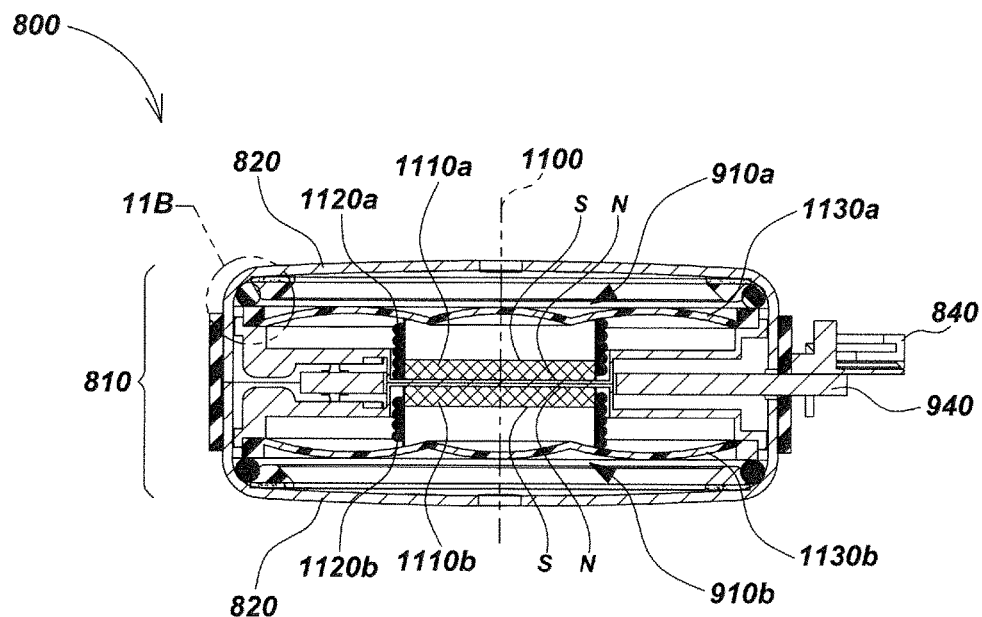
FIG. 11A illustrates details of the audio speaker device embodiment of FIG. 8 in sectional view along line 11A-11A.

For example, the drivers may be arranged so that the same magnetic polarity on the magnet of loudspeaker driver 910a faces that of driver 910b and they thereby repel each other. In other audio speaker device embodiments, multiple pairs of loudspeakers drivers (or other numbers of drivers) may be used, with drivers arranged with opposing magnetic polarities to cancel magnetic fields. As shown in FIG. 11A, drivers 910a and 910b may be closely positioned back to back and may be aligned along a shared axis (e.g. axis 1100) within audio speaker device 800. Connector 840 may be positioned along a protruding arm of a PCB that may otherwise be annular, such as PCB 940.

Figure 10A:
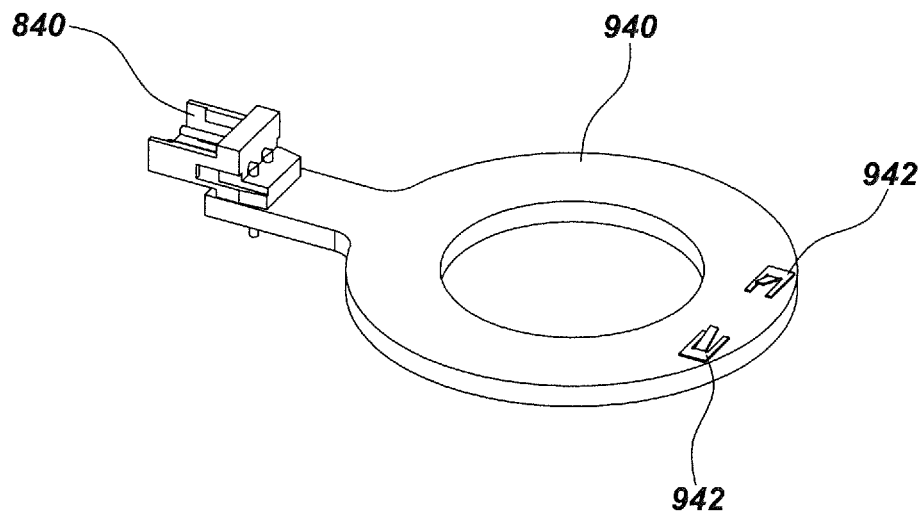
FIG. 10A is a detailed view of a PCB embodiment.
Figure 10B:
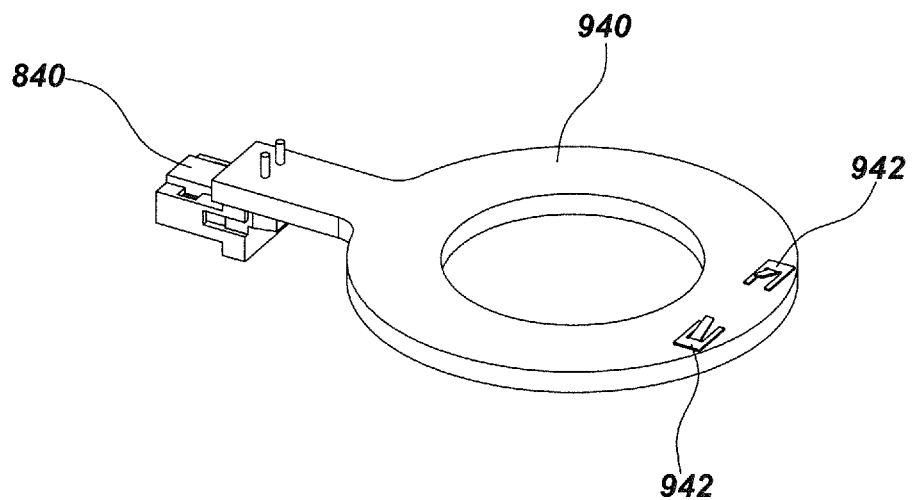
FIG. 10B illustrates details of the PCB embodiment of FIG. 10A showing the opposite face.

As illustrated in FIGS. 10A and 10B, PCB 940 may have a central opening shaped and dimensioned to allow the rear portion of each driver 910a and 910b containing the magnets therein (e.g., magnets 1110a and 1110b as shown in FIG. 11A) to seat within the central opening of the PCB 940. Finger contacts 942 may be placed on either face of PCB 940 and may be aligned with corresponding contact 912a and 912b on loudspeaker drivers 910a and 910b, respectively.

Returning to FIGS. 9, 912a and 912b may press into contacts 942 on their respective sides of PCB 940 to establish an electrical connection between PCB 940 and each driver 910a and 910b. Sealing tape 950 may secure circumferentially about the location where the two housing component 820 mate together, or they may be sealed by other sealing mechanisms such as adhesives, thermal bonding, and the like). The sealing tape 950 may be positioned beneath the securing band 830. It should be noted that a gap may be formed through both sealing tape 950 and securing band 830 to allow connector 840 to pass through. A backing ring 960 may be adhered within each of the two housing components 820. For example, adhesive tape 980 or other adhesive mechanisms may retain backing ring 960 in place and allow an O-ring 970 to be seated between each of the two housing elements 820 and respective drivers 910a and 910b to seal embodiment 800 from the external environment.

FIG. 11A is a cross-sectional view of embodiment 800. Magnets 1110a and 1110b within each respective driver 910a and 910b are shown, along with other components. As illustrated, magnets 1110a and 1110b may be positioned with like polarities facing each other. For example, the north pole of magnet 1110a may face the north pole of magnet 1110b. Each magnet 1110a and 1110b may seat within a voice coil 1120a or 1120b such that each loudspeaker driver 910a and 910b has the same response to electrical sound signals provided through connector 840 and PCB 940. Each voice coil 1120a, 1120b may be coupled to a diaphragm 1130a, 1130b to produce sound when the electrical signal is provided to the voice coils 1120a and 1120b.

Figure 11B:
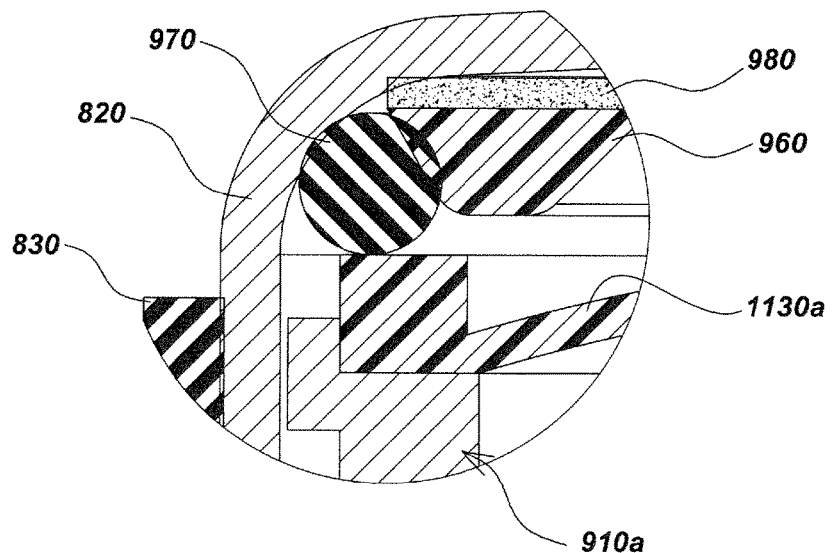
FIG. 11B illustrates details of a portion of the embodiment of FIG. 11A showing sealing of the enclosure.

Turning to FIG. 11B, an O-ring 970 may be seated between loudspeaker 1110a and the backing ring 960 within the corresponding housing component 820, providing a seal to external elements. Another O-ring 970 may also be seated between loudspeaker 1110b (as shown in FIG. 11A) and the backing ring 960 within the corresponding housing component 820.

Figure 12:
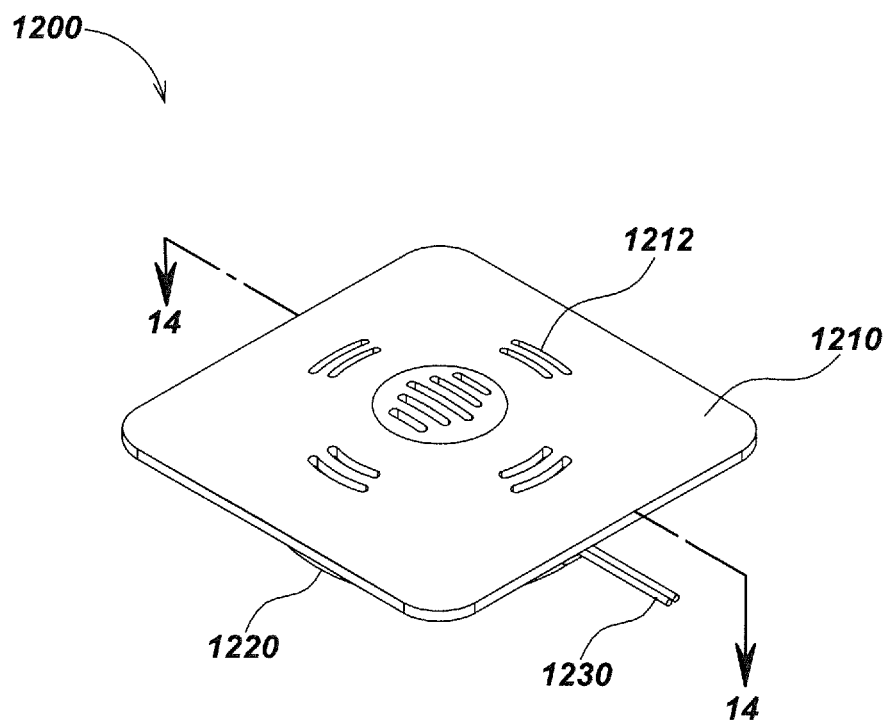
FIG. 12 illustrates details of a sound directing enclosure embodiment.

Audio speaker device embodiments in accordance with some aspects of the present disclosure may include a sound directing enclosure to direct sound out in a single direction while providing magnetic field cancelation. For example, as illustrated in FIG. 12, a sound directing enclosure embodiment 1200 may include a front enclosure facing 1210 having a series of sound holes 1212 to allow passage of sound from within. The sound directing enclosure 1200 may also include a sound redirecting enclosure portion 1220 (largely obscured in FIG. 12 but illustrated in detail in FIG. 13) that may mate to the front enclosure facing 1210 in assembly. The sound redirecting enclosure portion 1220 may allow redirection of sound from within towards the front enclosure facing 1210. A wiring harness 1230 may pass between front enclosure facing 1210 and sound redirecting enclosure portion 1220 as shown.

Figure 13:
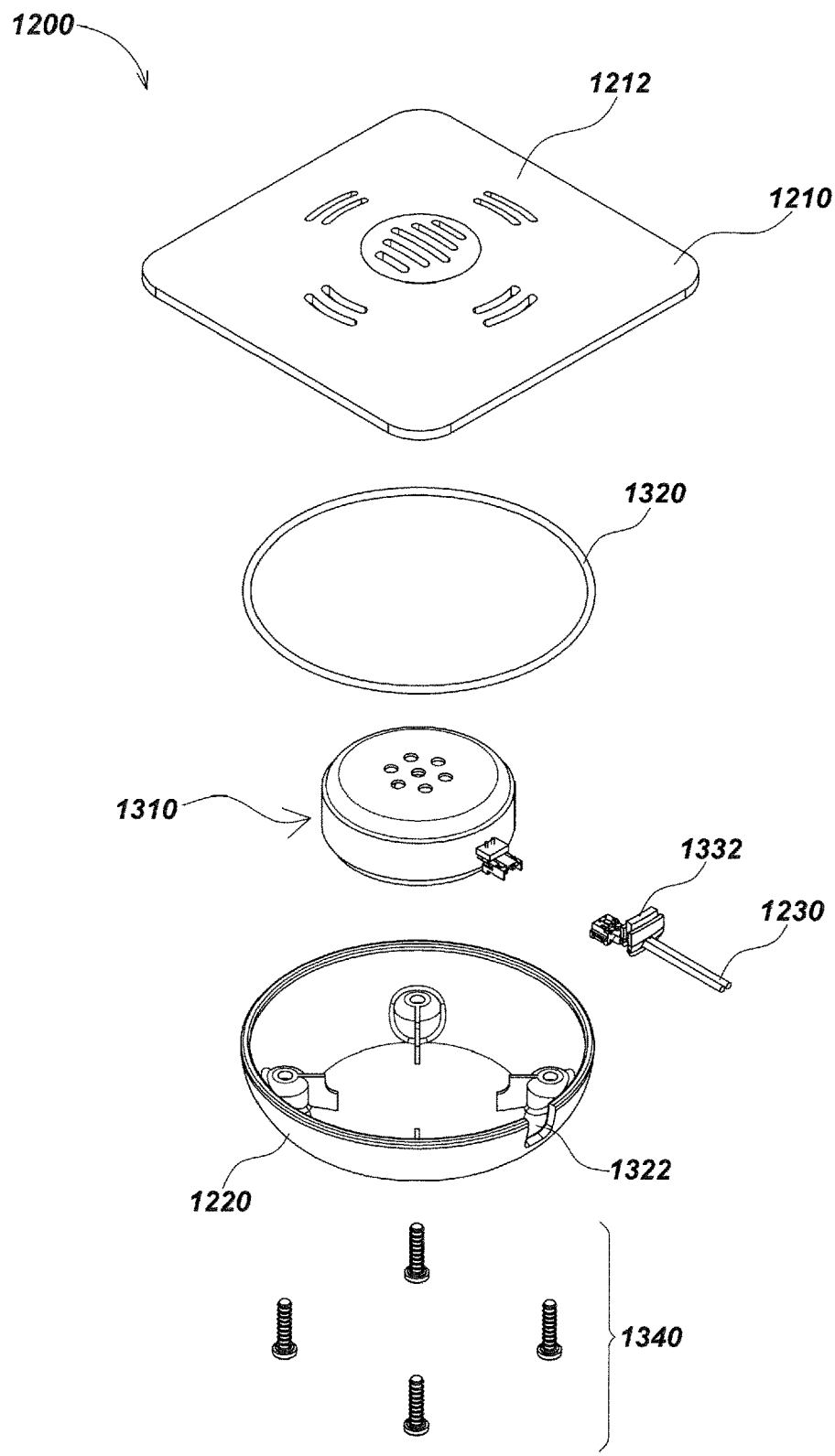
FIG. 13 illustrates details of the sound directing enclosure embodiment of FIG. 12 in exploded view.

Turning to FIG. 13, an audio speaker device embodiment 1310 may be positioned within the sound redirecting enclosure portion 1220 and enclosed therein by the front enclosure facing 1210. Audio speaker device embodiment 1310 may be or share aspects with audio speaker device embodiment 810 of FIGS. 8-11B or other audio speaker device embodiment described herein. The wiring harness 1230 may connect to the connector on audio speaker device embodiment 1310 providing audio signals thereto. The wiring harness 1230 may pass through a gap 1322 on sound redirecting enclosure portion 1220. A seal 1332 may be secured to wiring harness 1230 to close the space in gap 1322 not occupied by wiring passing through thus providing protection from the external environment. An O-ring 1320 may seat within sound directing enclosure embodiment 1200 between the front enclosure facing 1210 and sound redirecting enclosure portion 1220 provide additional protection from the external environment. A series of screws 1340 or other attachment elements may secure the sound redirecting enclosure portion 1220 and the front enclosure facing 1210.

Figure 14:
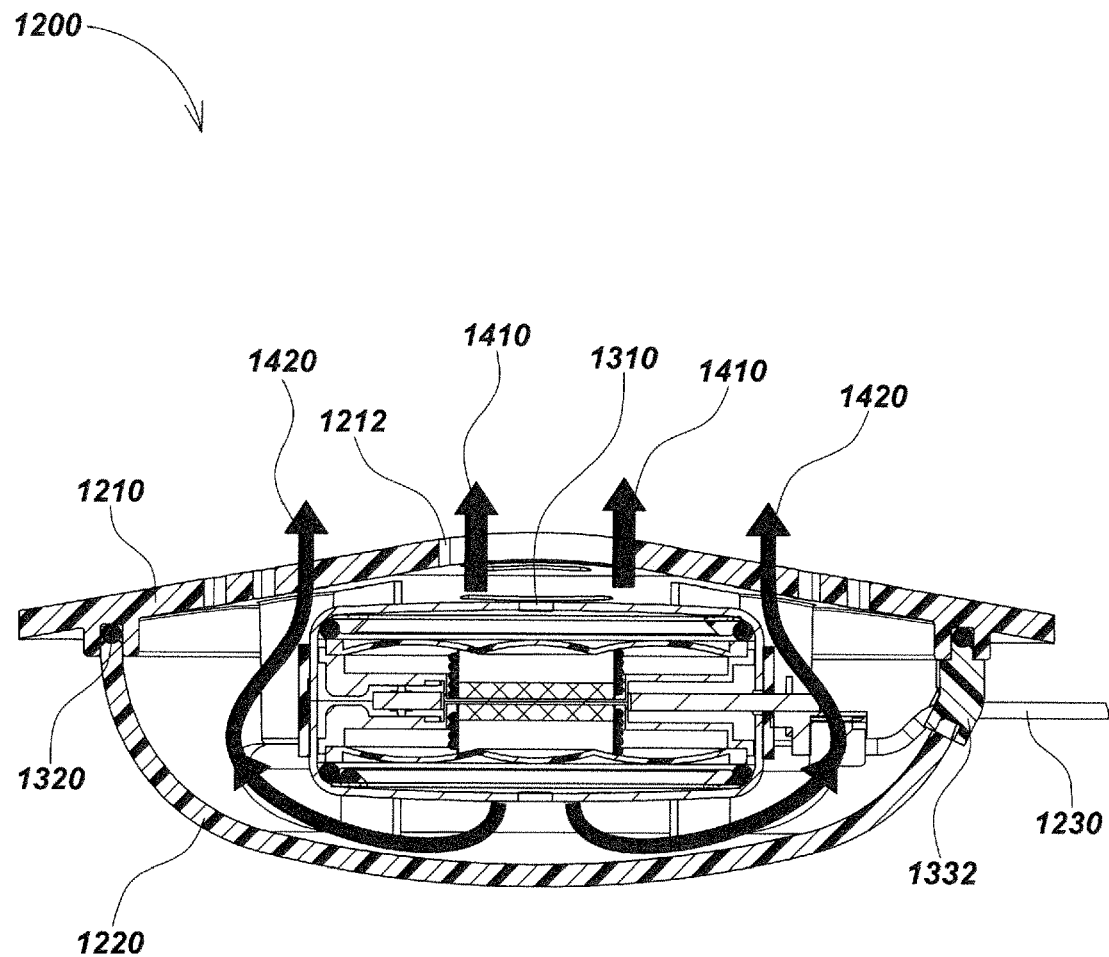
FIG. 14 illustrates details of the sound directing enclosure embodiment of FIG. 12 in sectional view along line 14-14.

Turning to FIG. 14, in operation, sound directing enclosure embodiment 1200 directs sound out through the sound holes 1212 formed through front enclosure facing 1210. For example, sound emitted from the side of the audio speaker device embodiment 1310 facing the front enclosure facing 1210 may travel along the direction 1410 and out of the device. Sound emitted from the side of the audio speaker device embodiment 1310 facing away the front enclosure facing 1210 may reflect off the sound redirecting enclosure portion 1220 and also be directed towards the sound holes 1212 formed through front enclosure facing 1210 along direction 1420. Sound wave distances of travel may be selected to provide constructive and/or destructive interference so as to control the frequency response of the associated speaker device or system.

Figure 15:
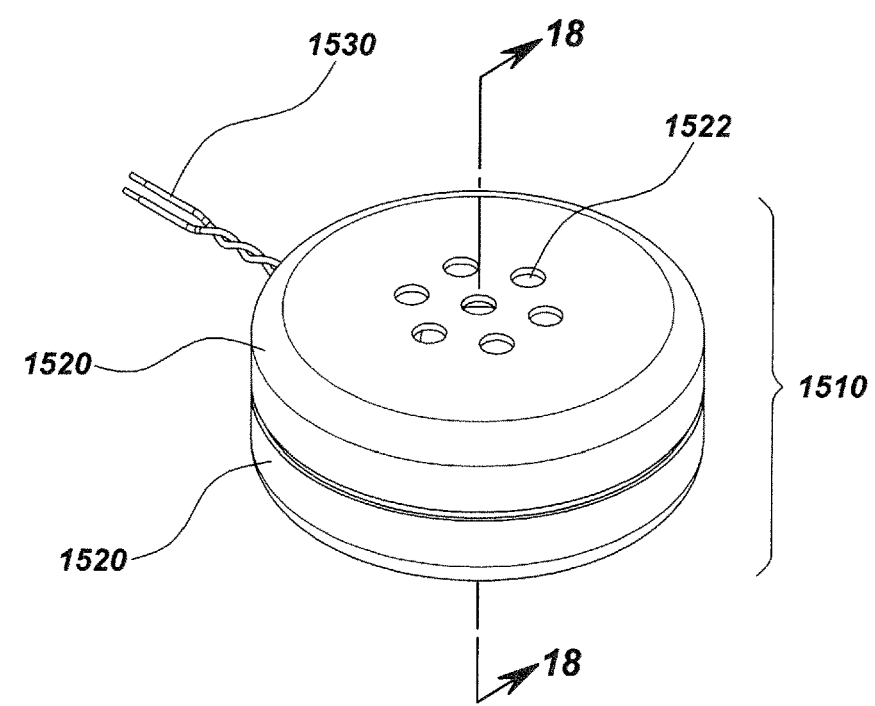
FIG. 15 illustrates details of an audio speaker device embodiment in isometric view.

FIG. 15 illustrates details of an audio speaker device embodiment 1500. Embodiment 1500 may be similar to those described previously herein and/or may share the same or similar components and assembly. Embodiment 1500 includes a speaker enclosure 1510 having a pair of loudspeaker drivers within (e.g., drivers 1610a and 1610b illustrated in FIG. 16). The enclosure 1510 may optionally be magnetically shielded with a material such as tin plated mild steel or other magnetically permeable materials or magnetic shielding assemblies. Audio speakers may cancel magnetic fields using opposing polarities in driver components to prevent or reduce generation of external electromagnetic fields and likewise reduce or eliminate an interfering magnetic field signatures over a desired frequency band of interest. For example, magnets in the loudspeaker drivers may be positioned such that north and north or south and south polarities face one another, thereby creating a magnetic quadrupole.

Figure 16:
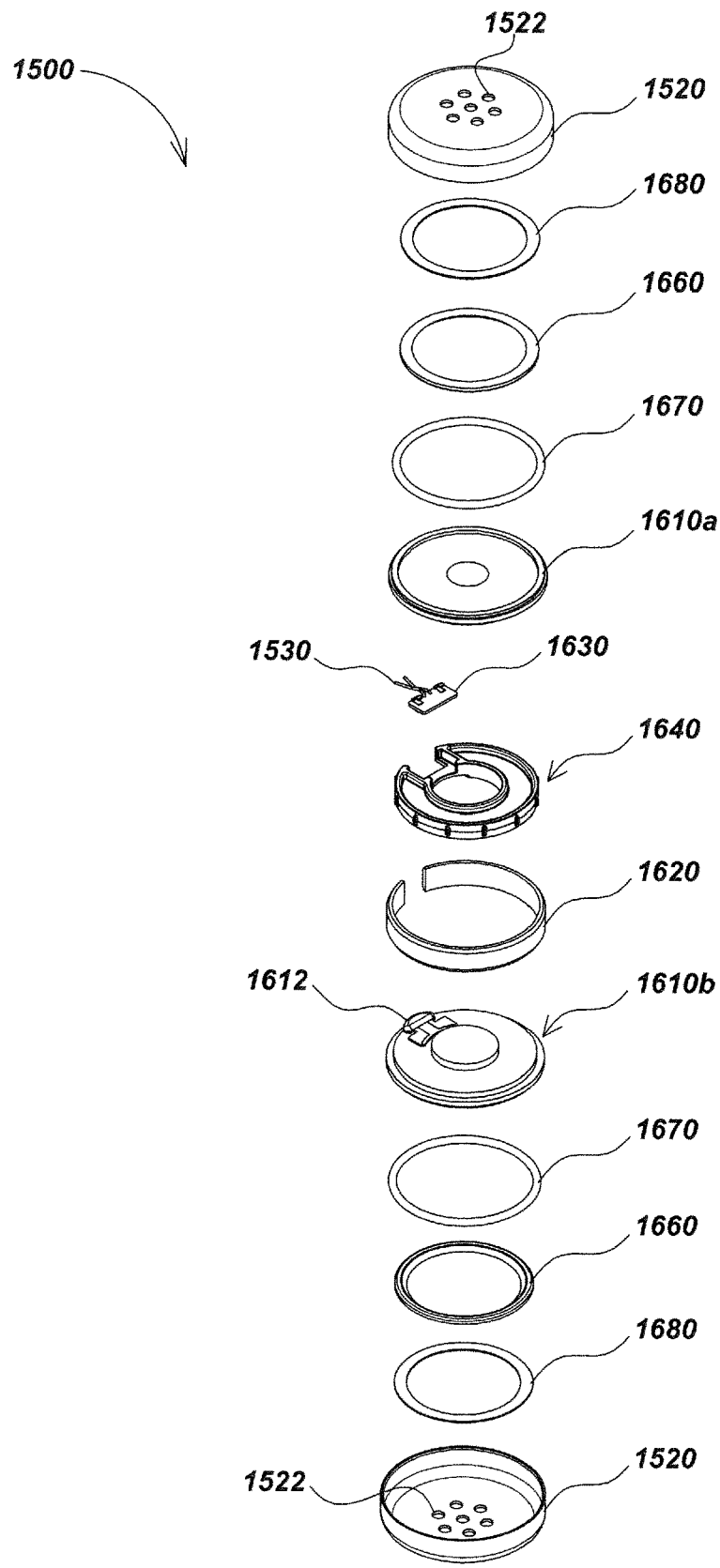
FIG. 16 illustrates details of the audio speaker embodiment of FIG. 15 in exploded view.

Enclosure 1510 may include two housing components 1520 that may be positioned back to back, forming an internal cavity for housing the loudspeaker drivers and other internal components (e.g., drivers 1610a and 1610b illustrated in FIG. 16). The two housing components 1520 may be secured together by force using an internal securing ring 1620 (as shown in further detail in FIG. 16) that may be press fit within the enclosure 1510. The internal securing ring 1620 may apply an outward force in contact with each of the two housing components 1520 to hold the enclosure 1510 together. Each of the housing components 1520 may be formed having a series of sound holes 1522. The sound holes 1522 may be formed to permit sound generated within enclosure 1510 to travel outside the enclosure to the outer environment (for a user to hear), while also allowing optional magnetic shielding of the enclosure 1510 to provide a path for the magnetic fields emitted from loudspeakers 1610a and 1610b (FIG. 16) and aid in containing magnetic fields therein. Connecting electrical signal wires 1530 may extend outside from within enclosure 1510, allowing electrical signals from a connected device (such as audio signal generator and amplifier of a utility locator such as utility locator 700) to drive the loudspeaker drivers 1610a and 1610b (FIG. 16) within enclosure 1510.

Additional details of embodiment 1500 are shown in FIG. 16. Driver embodiments 1610a and 1610b may be two of the same or similarly constructed loudspeaker driver elements having identical or similar characteristics over a targeted range of frequencies, and may have the same or similar electromagnetic field signatures to electrical driving signals over at least the targeted frequency range. Typically the drivers are of the same type and model.

The loudspeaker drivers may be oriented with opposing magnetic polarities so as to repel from one another and may be oriented to cancel the opposing dipole fields, thereby creating a magnetic quadrupole. For example, the same magnetic polarity on driver 1610a may face that of driver 1610b so they repel each other. The magnetic dipole fields may cancel to generate a magnetic quadrupole field that advantageously falls off more rapidly with distance than a dipole field. Loudspeakers 1610a and 1610b may be closely seated back to back and be positioned about a shared axis (e.g. axis 1800 illustrated in FIG. 18) within audio speaker embodiment 1500. Connecting wires 1530 may attach to a PCB 1630. The PCB 1630 may sit within a mounting cavity feature 1742 (as shown in FIG. 17) formed on a largely annular PCB retainer component 1640.

Figure 17:
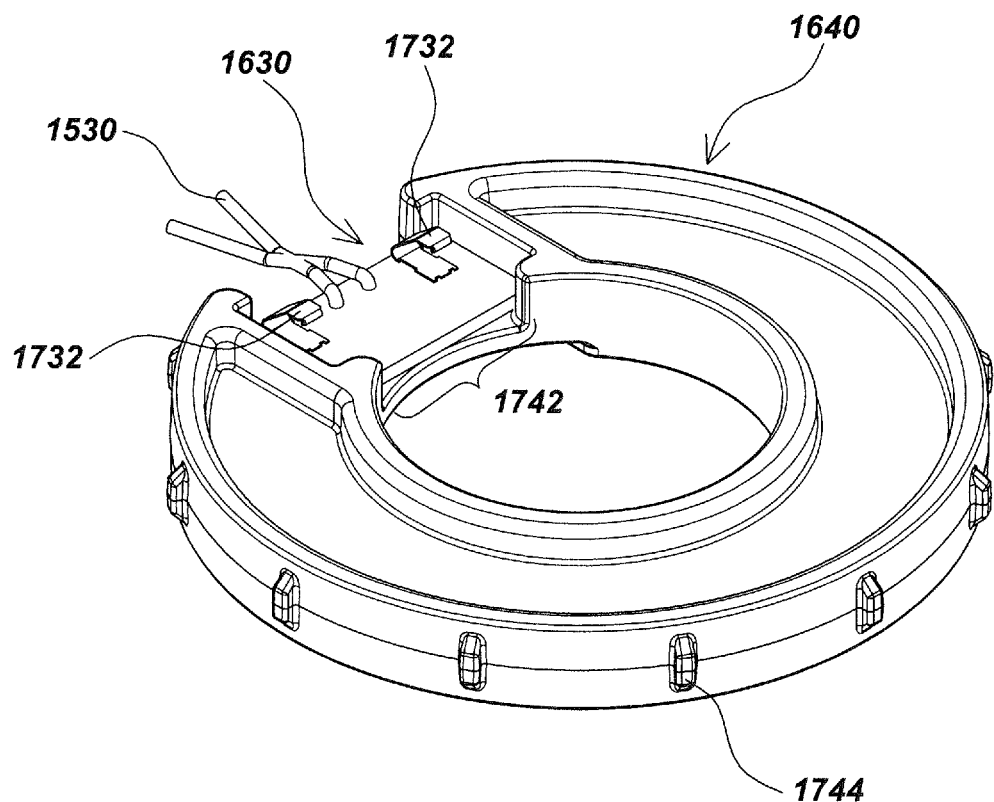
FIG. 17 illustrates details of the PCB retainer embodiment.
Figure 18:
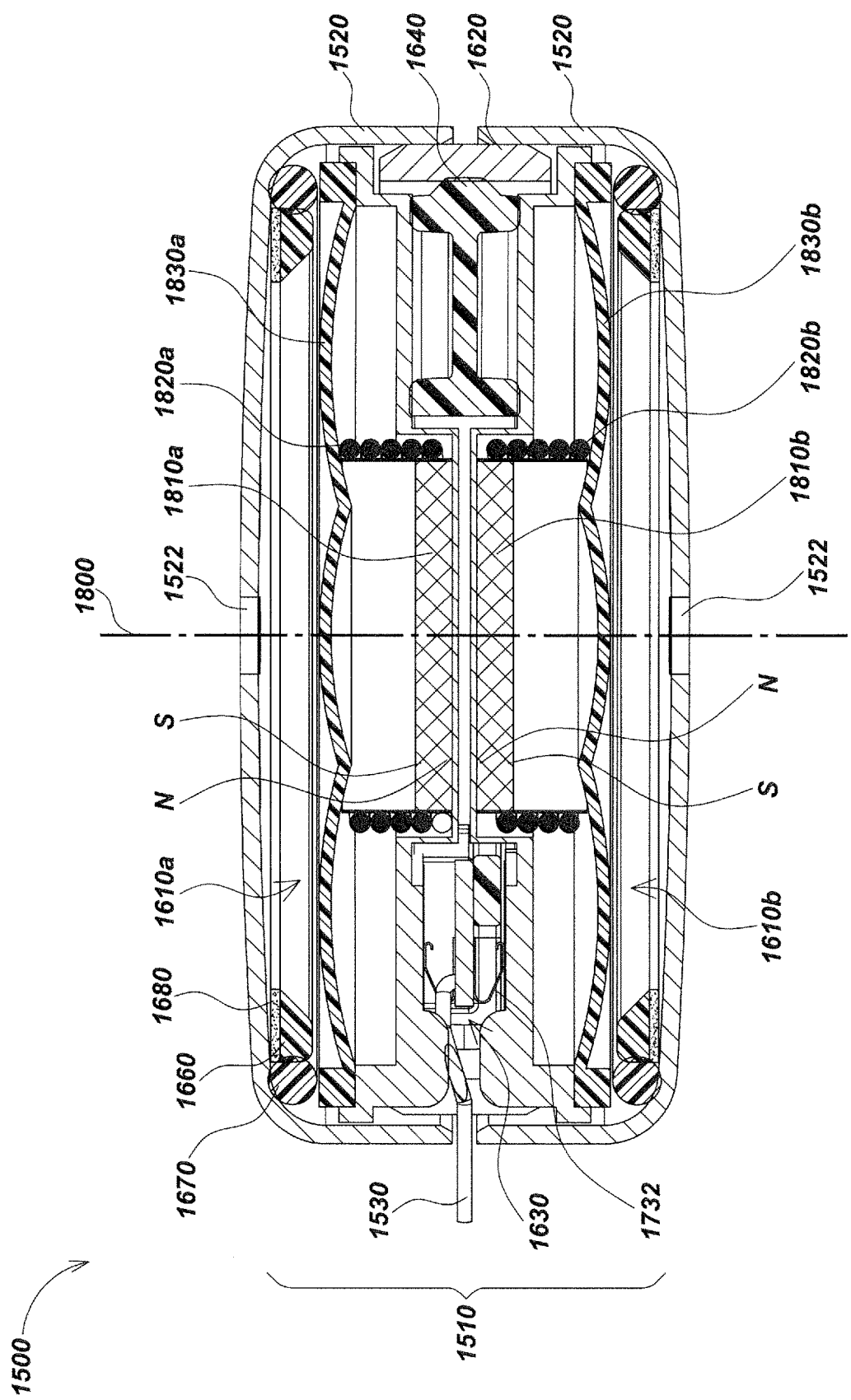
FIG. 18 illustrates the audio speaker device embodiment of FIG. 15 in sectional view along line 18-18.

As illustrated in FIG. 17, the PCB retainer 1640 may have a central opening dimensioned to allow the rear portion of each driver 1610a and 1610b, which contain the magnets therein (e.g., magnets 1810a and 1810b as shown in FIG. 18) to seat within a central opening of the annular PCB retainer 1640. The PCB retainer 1640 may include a series of evenly spaced rib features 1744 formed along its external circumference that may, in assembly, press into securing ring 1620 to ensure even distribution of press fit forces holding enclosure 1510 together. The PCB 1630 may include finger contacts 1732 situated on either face of PCB 1630.

Returning to FIG. 16, the contacts 1732 (as shown in FIG. 17) may align with contacts 1612 on each loudspeaker 1610a (obscured in FIG. 16) and 1610b and may press into contacts 1732 on their respective sides of PCB 1630, establishing an electrical pathway between PCB 1630 and each loudspeaker 1610a and 1610b. The securing ring 1620 may be press fit circumferentially within the enclosure 1510 between the PCB retainer 1640 and enclosure 1510 (FIG. 16), and in place apply an outward force where contacting each of the two housing components 1520, thereby holding the enclosure 1510 together. It should be noted that a gap may be formed through securing ring 1620 to allow the passage of connecting wires 1530. A backing ring 1660 may be adhered within each of the two housing components 1520. For example, adhesive tape 1680 may secure backing ring 1660 in place and allow an O-ring 1670 seated between each of the two housing halves 1520 and their respective loudspeakers 1610a and 1610b to seal the audio speaker device embodiment 1500 from the external environment.

Turning to FIG. 18, a cross-sectional view of details of the audio speaker device embodiment 1500 of FIG. 15 is shown. Magnets 1810a and 1810b may be positioned within each respective loudspeaker driver 1610a and 1610b as shown, with like polarities facing. For example, the north pole of magnet 1810a may face the north pole of magnet 1810b. Each magnet 1810a and 1810b may seat within a voice coil 1820a or 1820b such that each driver 1610a and 1610b has the same response to electrical current signals provided by an external electrical signal source. Each voice coil 1820a and 1820b may secure to a diaphragm 1830a or 1830b to produce sound when the audio electrical signal is provided to the voice coils 1820a and 1820b.

Skilled artisans may implement the described functionality in varying ways for each particular application, but such implementation decisions should not be interpreted as causing a departure from the scope of the present disclosure.

In some configurations, embodiments of magnetic field cancelling speaker devices and/or associated utility locators or other associated devices or systems may include means for performing various functions as described herein. In one aspect, the aforementioned means may be in mechanical or electrical components as described herein and/or as shown in the Drawings. The means in some embodiments may include a processing element using a processor or processors and associated memory in which embodiments reside, and which are configured to perform the functions recited by the aforementioned means. The aforementioned means may be, for example, modules or apparatus residing in a printed circuit board element or modules, or other electronic circuitry modules, to perform the functions, methods, and processes as are described herein. In another aspect, the aforementioned means may be a module or apparatus configured to perform the functions recited by the aforementioned means.

In some embodiments, functions, methods, and processes described may be implemented in whole or in part in hardware, software, firmware, or any combination thereof. If implemented in software, the functions may be stored on or encoded as one or more instructions or code on a non-transitory processor-readable medium and may be executed in one or more processing elements. Processor-readable media includes computer storage media. Storage media may be any available non-transitory media that can be accessed by a computer, processor, or other programmable digital device.

By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

It is understood that the specific order or hierarchy of steps or stages in any processes and methods described herein are examples of exemplary approaches. Based upon design preferences, it is understood that the specific order or hierarchy of steps in the processes may be rearranged while remaining within the scope of the present disclosure. Any method claims may present elements of the various steps in a sample order, and are not meant to be limited to the specific order or hierarchy presented or inclusion of all steps or inclusion of alternate or equivalent steps unless explicitly noted.

Those of skill in the art would understand that information and signals may be represented using any of a variety of different technologies and techniques. For example, audio or other signals, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that any illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps may have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The various illustrative logical blocks, modules, processes, methods, and/or circuits described in connection with the embodiments disclosed herein may be implemented or performed in a processing element with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps or stages of a method, process or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal or other device. In the alternative, the processor and the storage medium may reside as discrete components. Instructions to be read and executed by a processing element to implement the various methods, processes, and algorithms disclosed herein may be stored in a memory or memories of the devices disclosed herein.

The scope of the present invention is not intended to be limited to the aspects shown herein, but is to be accorded the full scope consistent with this specification and the associated Drawings, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c.

The previous description of the disclosed aspects is provided to enable any person skilled in the art to make or use embodiments of the presently claimed invention. Various modifications to these aspects will be readily apparent to those skilled in the art, and the generic principles defined herein may be applied to other aspects without departing from the spirit or scope of the invention. Thus, the presently claimed invention is not intended to be limited to the aspects shown herein, but is to be accorded the widest scope consistent with the appended Claims and their equivalents.

We claim:
1. A buried utility locator system, comprising:
 a buried utility locator, including:
  a housing;
  a magnetic field antenna array disposed on or in the housing for receiving magnetic field signals emitted from a hidden or buried conductor based on current flow therein and providing corresponding electrical output signals; and
  a utility locator electronics circuit disposed on or in the housing and operatively coupled to the magnetic field antenna array output to receive the electrical output signals and generate information about the hidden or buried conductor;
 an audio signal generator and audio amplifier operatively coupled to the utility locator electronics circuit to generate and provide an audio output signal associated with operation of the utility locator; and
 an audio speaker device, comprising:
  a speaker enclosure;
  input wiring operatively coupled to the audio output signal;
  a first loudspeaker driver having terminals operatively coupled to the input wiring to receive the audio output signal with a first polarity; and
  a second loudspeaker driver, of the same type as the first loudspeaker driver, having terminals operatively coupled to the input wiring to receive the audio output signal with a second polarity;
  wherein the first loudspeaker driver and the second loudspeaker driver are positioned within the speaker enclosure so as to at least partially cancel alternating current (AC) magnetic field signals emitted therefrom over a predefined frequency or range of frequencies overlapping the frequency or range of frequencies emitted from the hidden or buried conductor.

2. The locator device of claim 1, wherein the audio speaker device, audio signal generator, and audio amplifier are disposed on or within the buried utility locator housing.

3. The locator device of claim 1, wherein one or more of the audio speaker device, the audio signal generator, and the audio amplifier are separate from the buried utility locator housing.

4. The locator device of claim 1, wherein the first polarity and the second polarity are the same polarity.

5. The locator device of claim 1, wherein the first polarity and the second polarity are opposite polarities.

6. The locator device of claim 1, wherein the first loudspeaker driver has a first magnet and the second loudspeaker driver has a corresponding second magnet, and the first loudspeaker driver is positioned in close proximity to the second loudspeaker driver so that the polarities of the first magnet and second magnet are the same.

7. The locator device of claim 1, wherein the first loudspeaker driver has a first magnet and the second loudspeaker driver has a corresponding second magnet, and the first loudspeaker driver is positioned in close proximity to the second loudspeaker driver so that the polarities of the first magnet and second magnet are opposite.

8. The locator device of claim 1, wherein the first loudspeaker driver has a first voice coil and the second loudspeaker driver has a corresponding second voice coil, and the first loudspeaker voice coil and the second loudspeaker voice coil are positioned so that the first loudspeaker voice coil and the second loudspeaker voice coil have opposite polarities.

9. The locator device of claim 1, wherein the first loudspeaker driver has a first voice coil and the second loudspeaker driver has a corresponding second voice coil, and the first loudspeaker voice coil and the second loudspeaker voice coil are positioned so that the first loudspeaker voice coil and the second loudspeaker voice coil have the same polarity.

10. The locator device of claim 1, wherein the speaker enclosure is magnetically shielded with a magnetically permeable material.

11. The locator device of claim 10, wherein the magnetically permeable material is tin plated mild steel.

12. The locator device of claim 1, wherein the speaker enclosure is cylindrical in shape and includes a passage with a twisted pair passed therethrough.

13. The locator device of claim 12, further include a pair of caps having sound hole features positioned in the housing.

14. The locator device of claim 1, wherein the housing includes a toroidal groove feature, the caps include a lip feature, and the lips are positioned in close contact with the toroidal groove.

15. The locator device of claim 1, wherein the loudspeaker drivers are positioned about a shared longitudinal axis.

16. The locator device of claim 1, further including a locator handle, wherein the audio speaker device is disposed in, on, or within the handle.

17. The locator device of claim 1, wherein the audio speaker devices contains a PCB having spring contacts that press into corresponding contacts on the loudspeaker drivers establishing electrical pathways to communicate electrical sound signals thereto.

18. The locator device of claim 1, comprising an annular shaped PCB dimensioned to accommodate the rear portion of each loudspeaker driver therein.

19. The locator device of claim 1, wherein the audio speaker device includes an enclosure to direct sound from both loudspeaker drivers in a common direction.

20. The locator device of claim 1, wherein the loudspeaker drivers each include pole components having holes therein to shape a magnetic field, and wherein magnets of each of the loudspeaker drivers are positioned at least partially within the holes to shape the magnetic field to reduce interference with the locator antennas.

21. The locator of claim 1, further including a front enclosure facing positioned in close proximity to a first of the loudspeaker drivers and having one or more sound holes, and a sound redirecting portion to redirect incident sound waves from the other of the loudspeaker drivers towards the front face and sound holes.

22. A magnetic field attenuating audio speaker device, comprising:
 a speaker enclosure;
 a first loudspeaker driver having terminals operatively coupled to the input wiring to receive the audio output signal with a first polarity; and
 a second loudspeaker driver, of the same type as the first loudspeaker driver, having terminals operatively coupled to the input wiring to receive the audio output signal with a second polarity;
 wherein the first loudspeaker driver and the second loudspeaker driver are positioned within the speaker enclosure so as to at least partially cancel alternating current (AC) magnetic field signals emitted therefrom over a predefined frequency or range of frequencies overlapping the frequency or range of frequencies emitted from a hidden or buried conductor being located by a corresponding buried utility locator so as to reduce interference signals at the locator emitted from the speaker device.

23. The device of claim 22, wherein the first polarity and the second polarity are the same polarity.

24. The device of claim 22, wherein the first polarity and the second polarity are opposite polarities.

25. The device of claim 22, wherein the first loudspeaker driver has a first magnet and the second loudspeaker driver has a corresponding second magnet, and the first loudspeaker driver is positioned in close proximity to the second loudspeaker driver so that the polarities of the first magnet and second magnet are the same.

26. The device of claim 22, wherein the first loudspeaker driver has a first magnet and the second loudspeaker driver has a corresponding second magnet, and the first loudspeaker driver is positioned in close proximity to the second loudspeaker driver so that the polarities of the first magnet and second magnet are opposite.

* * * * *